United States Patent
Liu et al.

(10) Patent No.: US 11,967,045 B2
(45) Date of Patent: Apr. 23, 2024

(54) IMAGE PROCESSING DEVICE AND METHOD

(71) Applicant: SAMSUNG ELECTRONICS CO., LTD., Gyeonggi-do (KR)

(72) Inventors: Zikun Liu, Beijing (CN); Chunying Li, Beijing (CN); Han Qiu, Beijing (CN); Yinglu Liu, Beijing (CN)

(73) Assignee: Samsung Electronics Co., Ltd (KR)

( * ) Notice: Subject to any disclaimer, the term of this patent is extended or adjusted under 35 U.S.C. 154(b) by 350 days.

(21) Appl. No.: 17/272,866

(22) PCT Filed: Sep. 6, 2019

(86) PCT No.: PCT/KR2019/011557
§ 371 (c)(1),
(2) Date: Mar. 2, 2021

(87) PCT Pub. No.: WO2020/050686
PCT Pub. Date: Mar. 12, 2020

(65) Prior Publication Data
US 2021/0192687 A1    Jun. 24, 2021

(30) Foreign Application Priority Data

Sep. 7, 2018 (CN) .......................... 201811049734.3

(51) Int. Cl.
*G06T 3/4053* (2024.01)
*G06N 3/08* (2023.01)
*G06T 3/4046* (2024.01)

(52) U.S. Cl.
CPC ............. *G06T 3/4053* (2013.01); *G06N 3/08* (2013.01); *G06T 3/4046* (2013.01)

(58) Field of Classification Search
None
See application file for complete search history.

(56) References Cited

U.S. PATENT DOCUMENTS

| 2010/0183217 A1 | 7/2010 | Seung et al. |
| 2013/0177242 A1 | 7/2013 | Adams, Jr. et al. |

(Continued)

FOREIGN PATENT DOCUMENTS

| CN | 102842115 | 12/2012 |
| CN | 103248797 | 8/2013 |

(Continued)

OTHER PUBLICATIONS

PCT/ISA/210 Search Report issued on PCT/KR2019/011557, Dec. 18, 2019, pp. 3.

(Continued)

*Primary Examiner* — Jiangeng Sun
(74) *Attorney, Agent, or Firm* — The Farrell Law Firm, P.C.

(57) ABSTRACT

An image processing method comprises obtaining an input image; converting the input image or a feature map of the input image into a plurality of target input images or target feature maps, wherein a resolution of each of the target input images or the target feature maps is smaller than a resolution of the feature map of the input image or the input image, and pixels at the same position in each of the target input images or the target feature maps are of a neighborhood relationship with the input image or the feature map of the input image; processing at least a part of the plurality of target input images or target feature maps by one or more convolution blocks in a convolutional neural network; and increasing a resolution of a feature map output from the one or more convolution blocks in the convolutional neural network.

20 Claims, 16 Drawing Sheets

(56) References Cited

U.S. PATENT DOCUMENTS

| | | | |
|---|---|---|---|
| 2014/0072242 A1 | 3/2014 | Wei et al. | |
| 2017/0046816 A1 | 2/2017 | Choudhury et al. | |
| 2017/0287109 A1 | 10/2017 | Tasfi | |
| 2017/0351952 A1* | 12/2017 | Zhang | G06V 10/82 |
| 2018/0350077 A1* | 12/2018 | Lin | G06T 7/11 |
| 2019/0012768 A1* | 1/2019 | Tafazoli Bilandi | G06T 3/4046 |
| 2019/0147336 A1* | 5/2019 | Yu | G06F 18/214 |
| | | | 706/15 |
| 2019/0303715 A1* | 10/2019 | Jiang | G06F 18/24137 |

FOREIGN PATENT DOCUMENTS

| | | |
|---|---|---|
| CN | 106791927 | 5/2017 |
| CN | 107358576 | 11/2017 |
| CN | 107481188 | 12/2017 |
| CN | 108074218 | 5/2018 |
| WO | WO2017100903 | 6/2017 |

OTHER PUBLICATIONS

PCT/ISA/237 Written Opinion issued on PCT/KR2019/011557, Dec. 18, 2019, pp. 5.
Chinese Office Action dated Aug. 3, 2023 issued in counterpart application No. 201811049734.3, 26 pages.

\* cited by examiner

IMAGE PROCESSING DEVICE AND METHOD

PRIORITY

This application is a National Phase Entry of PCT International Application No. PCT/KR2019/011557, which was filed on Sep. 6, 2019, and claims priority to Chinese Patent Application No. 201811049734.3, which was filed on Sep. 7, 2018, the contents of each of which are incorporated herein by reference.

TECHNICAL FIELD

The disclosure relates to the field of artificial intelligence technologies, and in particular, to an image processing device and method.

BACKGROUND ART

With the development of convolutional neural networks and deep learning, high-performance network models become more and more complex. In many computing-constrained environments, there are a wide range of applications that require accelerating convolutional neural networks. Especially in mobile phones, there are more and more applications of visual intelligence algorithms. How to accelerate the calculation of these algorithms in the limited computing resources on mobile phones is of great significance. In addition, in other terminal devices, there is a similar demand due to limited computing power. These terminal devices include, but are not limited to, smart TVs, smart refrigerators, surveillance cameras, smart driving vehicles, service robots, small aerospace vehicles, and the like. For algorithms that operate in the cloud, it is also necessary to speed up the calculation and save computing resources and costs.

DISCLOSURE OF INVENTION

Technical Problem

The computational complexity of a model itself can be reduced by optimizing the model. The common method is to reduce the amount of calculation of the model by reducing the total number of weights, such as deleting unimportant weights (connections), weight thinning, and reducing bit numbers of weights. However, reduction of weights may result in loss of input information, resulting in a significant degradation in model performance.

In addition, most existing solutions are more suitable for image-level tasks (such as image classification tasks) and regional-level tasks (such as target detection tasks). As for pixel-level tasks (e.g., image segmentation, depth prediction, super-resolution, de-noising, etc.), because the network applied to pixel-level tasks is generally more complex and sensitive to weight reduction, the above methods are not applicable to pixel-level tasks.

In summary, there is a need for an image processing device and method that can effectively accelerate the processing speed of an image processing neural network.

Solution to Problem

The present disclosure provides an image processing device and method to at least partially solve the above-mentioned technical problems.

According to an aspect of the present disclosure, there is provided an image processing method, including obtaining an input image; converting the input image or a feature map of the input image into a plurality of target input images or target feature maps, wherein a resolution of each of the target input images or the target feature maps is smaller than a resolution of the feature map of the input image or the input image, and pixels at the same position in each of the target input images or the target feature maps are of a neighborhood relationship with the input image or the feature map of the input image; processing at least a part of the plurality of target input images or target feature maps by one or more convolution blocks in a convolutional neural network; and increasing a resolution of a feature map output from the one or more convolution blocks in the convolutional neural network.

According to an aspect of the present disclosure, there is provided an image processing device, including a transceiver configured to obtain an input image; at least one processor configured to: convert the input image or a feature map of the input image into a plurality of target input images or target feature maps, wherein a resolution of each of the target input images or the target feature maps is smaller than a resolution of the feature map of the input image or the input image, and pixels at the same position in each of the target input images or the target feature maps are of a neighborhood relationship in the input image or the feature map of the input image; process at least part of the plurality of target input images or target feature maps by one or more convolution blocks in a convolutional neural network; and increase a resolution of a feature map output from the one or more convolution blocks in the convolutional neural network.

MODE FOR THE INVENTION

Figure 1:
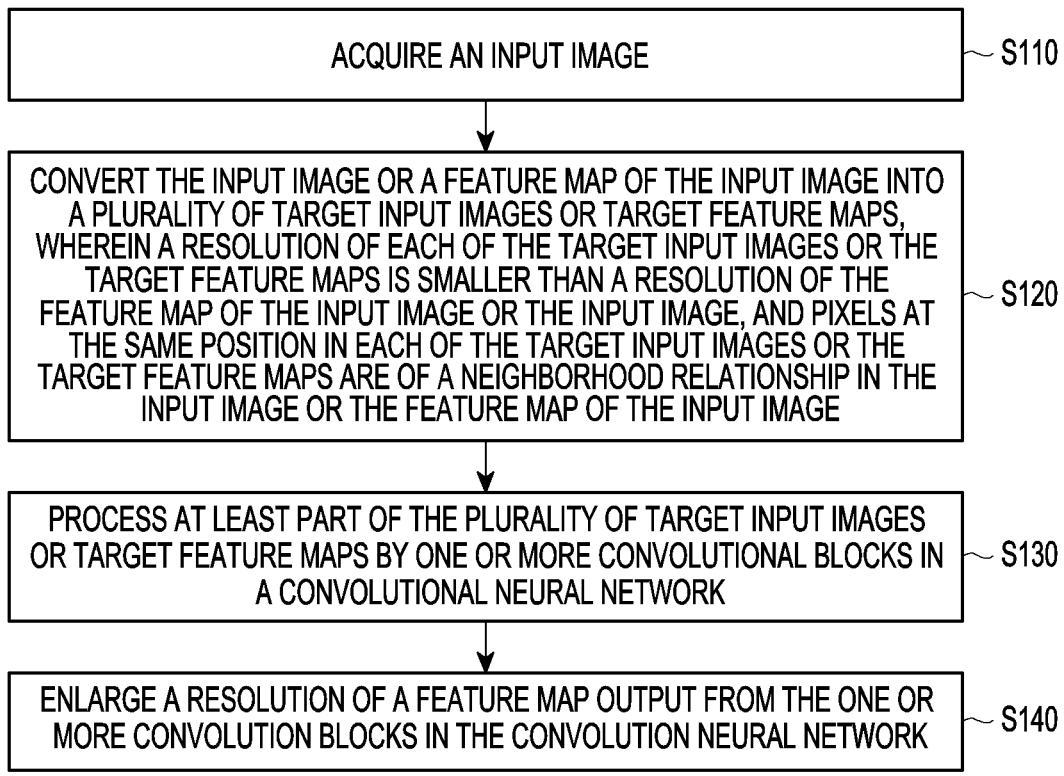
FIG. 1 illustrates a schematic flow chart of an image processing method according to an embodiment of the present disclosure.

The embodiments of the present application are described in detail below, and the examples of the embodiments are illustrated in the accompanying drawings, wherein the same or similar reference numerals indicate the same or similar elements or elements having the same or similar functions. The embodiments described below with reference to the accompanying drawings are exemplified, and are not to be construed as limiting the present application.

It shall be understood by one skilled in the art that the singular forms "a", "an", "the" and "said" used herein comprise the plural form, unless otherwise stated. It is to be understood that the phrase "comprise" refers to the presence of features, integers, steps, operations, components and/or elements, and does not exclude the presence of one or more other features, integers, steps, operations, components and/or elements. It is be understood that when an element is referred to as being "connected" or "coupled" to another element, it can be directly connected or coupled to the other element, or there is an intermediate element. Further, the term "connected" or "coupled" as used herein may include either a wireless connection or a wireless coupling. The term "and/or" used herein includes all or any and all combinations of one or more of the associated listed.

In order to avoid the significant degradation of performance while accelerating the calculation of a convolutional neural network, the present disclosure provides an image processing device and method, the main core of which is to perform neural network calculation acceleration based on the resolution propagation effect. Specifically, a large-resolution input image or a feature map is converted into a plurality of small-resolution target input images or target feature maps, wherein the resolution of each of the target input images or target feature maps is smaller than the resolution of the input image or the feature map. Then at least a portion of the target input images or the target feature maps are processed by one or more convolution blocks in the convolutional neural network. In addition to the total number of weights, another factor that determines the amount of multiplication and addition is the resolution of the input data. When the resolution of the input data of the convolutional neural network is small, the calculation speed is faster. Therefore, according to the solution of the present disclosure, it can improve the calculation speed of the convolutional neural network.

In addition, after processing at least part of the target input images or the target feature maps by one or more convolution blocks in the convolutional neural network, the present disclosure enlarges the processed small-resolution feature maps to a larger-resolution feature map (for example, by enlarging the resolution to the resolution of the lager-resolution feature map), thereby improving the resolution of the output feature map, maintaining the information integrity, and even increasing the resolution of the image.

In the present disclosure, the plurality of small-resolution target input images or feature maps collectively constitute an interlaced space of the large-resolution input image or feature map.

In order to make the objects, technical solutions and advantages of the present disclosure more clear, the present disclosure will be further described in detail below with reference to the specific embodiments of the present disclosure and by referring to the drawings.

FIG. 1 illustrates a schematic flow chart of an image processing method according to an embodiment of the present disclosure. The method may be performed by a terminal device, wherein the terminal device includes, but is not limited to, at least one of the following: a mobile phone, a smart TV, a smart refrigerator, a surveillance camera, a smart driving car, a service robot, a small aerospace vehicle, and the like. As shown in FIG. 1, the image processing method includes the following steps.

At step S110, an input image is acquired.

At step S120, the input image or a feature map of the input image are converted into a plurality of target input images or target feature maps, wherein a resolution of each of the target input images or the target feature maps is smaller than a resolution of the feature map of the input image or the input image, and pixels at the same position in each of the target input images or the target feature maps are of a neighborhood relationship in the input image or the feature map of the input image.

At step S130, at least part of the plurality of target input images or target feature maps are processed by one or more convolution blocks in a convolutional neural network.

At step S140, a resolution of a feature map output from the one or more convolution blocks in the convolutional neural network is enlarged.

In the present embodiment, an input image is converted into a plurality of target input images, or a feature map of the input image is converted into a plurality of target feature maps, and then at least part of the target input images or target feature maps are processed by one or more convolution blocks in a convolutional neural network. A resolution of each of the target input images or the target feature maps is smaller than a resolution of the feature map of the input image or the input image, thereby reducing the calculation amount of the convolution block, improving the computational speed of the convolutional neural network. Furthermore, in the present embodiment, the resolution of the feature map output from the one or more convolution blocks in the convolutional neural network is enlarged, thereby improving the quality of the image output from the network.

The above feature map can be obtained by any method. For example, in some embodiments, the feature map is obtained by processing the input image by the one or more convolution blocks in the convolutional neural network. However, in other embodiments, the feature map of the input image may also be obtained by any other means currently used or developed in the future, and the embodiments of the present disclosure are not limited by the specific manner in which the feature map is obtained.

In some embodiments, enlarging the resolution of the feature map output from the one or more convolution blocks in the convolutional neural network may include: enlarging the resolution of the feature map output from any one or more convolution blocks in the convolutional neural network to a resolution that is obtained by only processing the input image in the convolutional neural network. In the embodiment, enlarging the resolution may include enlarging the resolution of a feature map finally output from the convolutional neural network, or enlarging the resolution of a feature output from a convolution block in the middle of the convolutional neural network, or enlarging the resolution of a feature map output from one convolution block, or enlarging the resolution of feature maps output from a plurality of convolution blocks. The operation is flexible. Moreover, since the input image is converted into a plurality of target input images and the resolution of the feature map finally output from the convolutional neural network, the images or feature maps processed by the convolution blocks in the middle of the convolutional neural network are of a small resolution, thereby further reducing the calculation amount of the convolution block and improving the computational speed of the convolutional neural network. Enlarging the resolution of feature maps output from a plurality of convolution blocks may include enlarging the resolution more than one time to enlarge the resolution to be higher. A relatively simple method of enlarging the resolution can be provided by enlarging the resolution of the feature map output from one convolution block.

Moreover, in other embodiments, the resolution of the feature map output from the convolutional neural network may even be enlarged to be higher than the resolution that is obtained by only processing the input image in the convolutional neural network, to achieve super resolution cases, such as those described below related with an ULED display.

Optionally, the method further includes: performing online training on the convolutional neural network, or performing online training on the convolutional neural network by other devices, and acquiring the convolutional neural network from the other devices after training. This step is not shown in FIG. 1. This step may be performed between step S110 and step S120, or may be performed before step S110, or may be performed before step S130. The convolutional neural network can also be trained offline.

Optionally, after step S140, the number of channels of the input image or feature map of the convolution block in the convolutional neural network is adjusted, and the convolutional neural network is retrained. By retraining the convolutional neural network, the network would fit to the new number of channels.

Step S120 may include:

A. determining a down resolution ratio N between the resolution of the target input image or the target feature map and the resolution of the feature map of the input image or the input image.

The down resolution ratio N is a parameter indicating a resolution reduction ratio between the target input image and the input image or a parameter indicating a resolution reduction ratio between the target feature map and the feature map of the input image, and can be implemented by any feasible means. For example, for the input image/the target input image, $$N = \frac{\text{width of the target input image}}{\text{width of the input image}},$$

and for a feature map of the input image/the target feature map $$N = \frac{\text{width of the target feature map}}{\text{width of the feature map of the input image}}.$$

However, the technical solution of the embodiments of the present disclosure is not limited thereto. For example, a height ratio between images may be employed instead of a width ratio to characterize N, or a feature capable of reflecting the resolution reduction between the target input image or target feature map and the input image or the feature map of the input image may be used to calculate N.

B. determining a number F*F of the target input images or the target feature maps according to the down resolution ratio N, wherein $$F=U(N)$$

U(·) is a ceiling function; and

C. converting the input image or the feature map of the input image into a number F*F of the target input images or the target feature maps.

In the above example, the number of target input images or target feature maps is determined according to a down resolution ratio N between the resolution of the target input image or the target feature map and the resolution of the feature map of the input image or the input image, however, in others In the example, the number of target input images or target feature maps may also be directly specified according to any other factors or even directly specified. Embodiments of the present disclosure are not limited by the specific determination method of the number of target input images or target feature maps.

In some embodiments, converting the input image or the feature map of the input image into a number F*F of the target input images or the target feature maps includes:

performing down-sampling on the input image or the feature map of the input image by a step size N to obtain a number F*F of the target input images or the target feature maps, wherein the sampling formula is:

$$O_{i,j}(x,y)=I(xN+i, yN+j)$$

wherein I and O represent the feature map of the input image or the input image and the target input image or the target feature map, respectively, and i and j are indexes established for the plurality of converted target input images or target feature maps, and $i \in [0,F)$, $j \in [0,F)$, x and y are abscissa and ordinate of a pixel in a corresponding target input image or target feature map, respectively, and $x \in [0, W')$, $y \in [0,H')$, $W'=L(W/N)$, $H'=L(H/N)$, $xN+i$ and $yN+j$ are indexes of a pixel in the input image or the feature map of the input image, U(·) represents a ceiling function, L(·) represents a floor function, and W and H represent the width and height of the feature map of the input image or the input image, respectively, W' and H' represent the width and height of the target input image or the target feature map, respectively.

In the above manner, the number F*F of the converted target input images or the target feature maps collectively constitute an interlaced space of the input image or the feature map of the input image.

In some embodiments, processing at least part of the plurality of target input images or target feature maps by one or more convolution blocks in a convolutional neural network includes:

processing at least part of the plurality of target input images or target feature maps by one or more convolution blocks in a convolutional neural network by one of:

convoluting a part of the plurality of target input images or target feature maps by each convolution block;

convoluting a part of the plurality of target input images or target feature maps by each weighted convolution block; and convoluting at least part of the plurality of target input images or target feature maps according to the information differences of the plurality of target input images or the target feature maps.

In some embodiments, convoluting a part of the plurality of target input images or target feature maps by each convolution block includes:

convoluting a part of the plurality of target input images or target feature maps by each convolution block, wherein the target input images or the target feature maps of the part have a specific step interval therebetween, or convoluting a part of the plurality of target input images or target feature maps by each convolution block, wherein a correlation between the target input images or the target feature maps of the part processed by one convolution block is higher than a threshold, or the target input images or the target feature maps of the part processed by one convolution block are multiple preset target input images or target feature maps having a correlation.

It should be noted that the correlation between channels can be manually selected, or can be measured by statistically calculating the distance between the input sub-channels (for example, Euclidean distance), or can be obtained by calculating a co-correlation matrix.

In some embodiments, convoluting a part of the plurality of target input images or target feature maps by each convolution block, wherein the target input images or the target feature maps of the part have a specific step interval therebetween, includes:

dividing the target input images or the target feature maps into R groups of target input images or target feature maps, wherein R is an integer, the target input images or the target feature maps in each group have a step interval R therebetween, and wherein the R groups of target input images or target feature maps do not overlap;

convoluting each group of target input images or target feature maps to obtain a corresponding output feature map, wherein a first target input image or a first target feature map of the t-th group of target input images or target feature maps is the t-th target input image or target feature map, wherein t∈[0,R−1]; and wherein the i-th target input image or the i-th target feature map of the t-th group of target input images or target feature maps is the (i*R+t)th target input image or the (i*R+t)th target feature map in all target input images or target feature maps, wherein i is a non-negative integer.

R may be determined in any manner, such as by default, as specified by the user-operator or by some other rule, and embodiments of the present disclosure are not limited by the specific manner in which R is determined.

In some embodiments, convoluting at least part of the plurality of target input images or target feature maps by each weighted convolution block includes:

convoluting the target input images or target feature maps by each convolution block according to the following formula:

$$S_i = \sum_{p=0}^{P} w_{i,p} Conv_{i,p}(M_p)$$

wherein $S_i$ represents the i-th output feature map, $Conv_{i,p}(M_p)$ represents the convolution operation on the p-th target input image or target feature map MP by the i-th convolution kernel, $w_{i,p}$ represents a weight for the i-th convolution kernel corresponding to the p-th target input image or target feature map, and P represents the total number of the target input images or target feature maps.

The pixels at the same position among many channels in the interlaced space have a neighborhood relationship of different distances in the original image. The above example takes into account the difference in the neighborhood relationship, so that the input information can be kept integral.

In some embodiments, convoluting at least part of the plurality of target input images or target feature maps according to the information differences between the plurality of target input images or the target feature maps includes:

computing the information differences of the plurality of target input images or target feature maps according to the following formula:

$$OS_p = M_p - M_b$$

wherein $M_p$ represents the p-th target input image or target feature map, $M_b$ represents a mapped reference target input image or target feature map, and $OS_p$ is offset information of the p-th target input image or target feature map, the reference target input image or target feature map being the converted first target input image or target feature map.

Figure 2:
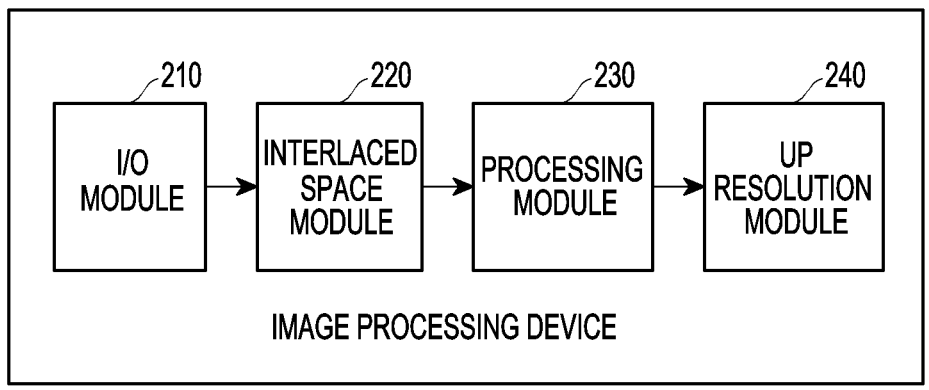
FIG. 2 illustrates a schematic block diagram of an image processing device according to an embodiment of the present disclosure.

FIG. 2 illustrates a schematic block diagram of an image processing device according to an embodiment of the present disclosure. A shown in FIG. 2, the image processing device according to the present disclosure includes:

an I/O module 210 for acquiring an input image;

an Interlaced Space Module (ISM) 220 configured to convert the input image or a feature map of the input image into a plurality of target input images or target feature maps, wherein a resolution of each of the target input images or the target feature maps is smaller than a resolution of the feature map of the input image or the input image, and pixels at the same position in each of the target input images or the target feature maps are of a neighborhood relationship in the input image or the feature map of the input image;

a processing module 230 configured to process at least part of the plurality of target input images or target feature maps by one or more convolution blocks in a convolutional neural network; and an Up Resolution module (URM) 240 configured to enlarge a resolution of a feature map output from the one or more convolution blocks in the convolutional neural network.

The image processing device of the present disclosure utilizes an interlaced space module to reduce the resolution of the input in the interlaced space while maintaining information integrity and the output resolution of the original neural network is maintained by the up resolution module.

In some embodiments, the processing module 230 is configured to obtain the feature map of the input image from the input image by the one or more convolution blocks in the convolutional neural network.

In some embodiments, the up resolution module 240 is configured to enlarge a resolution of a feature map output from any one or more convolution blocks in the convolutional neural network to a resolution that is obtained by only processing the input image in the convolutional neural network.

In the present embodiment, an input image is converted into a plurality of target input images, or a feature map of the input image is converted into a plurality of target feature maps, and then at least part of the target input images or target feature maps are processed by one or more convolution blocks in a convolutional neural network. A resolution of each of the target input images or the target feature maps is smaller than a resolution of the feature map of the input image or the input image, thereby reducing the calculation amount of the convolution block, improving the computational speed of the convolutional neural network. Furthermore, in the present embodiment, the resolution of the feature map output from the one or more convolution blocks in the convolutional neural network is enlarged, thereby improving the quality of the image output from the network.

The above feature map can be obtained by any means. For example, in some embodiments, the feature map is obtained by processing the input image by the one or more convolution blocks in the convolutional neural network. However, in other embodiments, the feature map of the input image may also be obtained by any other means currently used or developed in the future, and the embodiments of the present disclosure are not limited by the specific manner in which the feature map is obtained.

Moreover, in other embodiments, the resolution of the feature map output from the convolutional neural network may even be enlarged to be higher than the resolution that is obtained by only processing the input image in the convolutional neural network, to achieve super resolution cases, such as those described below related with ULED display screens.

In some embodiments, the interlaced space module 220 is configured to convert the input image or a feature map of the input image into a plurality of target input images or target feature maps by:
determining a down resolution ratio N between the resolution of the target input image or the target feature map and the resolution of the feature map of the input image or the input image;
determining a number F*F of the target input images or the target feature maps according to the down resolution ratio N, wherein $$F = U(N)$$

U(·) is a ceiling function; and
converting the input image or the feature map of the input image into a number F*F of the target input images or the target feature maps.

In some embodiments, the interlaced space module 220 is configured to convert the input image or the feature map of the input image into a number F*F of the target input images or the target feature maps by:
performing down-sampling on the input image or the feature map of the input image by a step size N to obtain a number F*F of the target input images or the target feature maps, wherein the sampling formula is:

$$O_{i,j}(x,y) = I(xN+i, yN+j)$$

wherein I and O represent the feature map of the input image or the input image and the target input image or the target feature map, respectively, and i and j are indexes established for the plurality of converted target input images or target feature maps, and $i \in [0,F)$, $j \in [0,F)$, x and y are abscissa and ordinate of a pixel in a corresponding target input image or target feature map, respectively, and $x \in [0, W')$, $y \in [0, H')$, $W' = L(W/N)$, $H' = L(H/N)$, xN+i and yN+j are indexes of a pixel in the input image or the feature map of the input image, U(·) represents a ceiling function, L(·) represents a floor function, and W and H represent the width and height of the feature map of the input image or the input image, respectively, W' and H' represent the width and height of the target input image or the target feature map, respectively.

In the above example, the down resolution ratio N is a parameter indicating a resolution reduction ratio between the target input image and the input image or a parameter indicating a resolution reduction ratio between the target feature map and the feature map of the input image, and can be implemented by any feasible means. For example, for the input image/the target input image, $$N = \frac{\text{width of the target input image}}{\text{width of the input image}},$$

and for a feature map of the input image/the target feature map, $$N = \frac{\text{width of the target feature map}}{\text{width of the feature map of the input image}}.$$

However, the technical solution of the embodiments of the present disclosure is not limited thereto. For example, a height ratio between images may be employed instead of a width ratio to characterize N, or a feature capable of reflecting the resolution reduction between the target input image or target feature map and the input image or the feature map of the input image may be used to calculate N.

In the above example, the number of target input images or target feature maps is determined according to a down resolution ratio N between the resolution of the target input image or the target feature map and the resolution of the feature map of the input image or the input image, however, in others In the example, the number of target input images or target feature maps may also be directly specified according to any other factors or even directly specified. Embodiments of the present disclosure are not limited by the specific determination method of the number of target input images or target feature maps.

In some embodiments, the processing module 230 is configured to process at least part of the plurality of target input images or target feature maps by one or more convolution blocks in a convolutional neural network by one of:
convoluting a part of the plurality of target input images or target feature maps by each convolution block;

convoluting a part of the plurality of target input images or target feature maps by each weighted convolution block; and convoluting at least part of the plurality of target input images or target feature maps according to the information differences of the plurality of target input images or the target feature maps.

In some embodiments, the processing module 230 is configured to convolute a part of the plurality of target input images or target feature maps by each convolution block by:

convoluting a part of the plurality of target input images or target feature maps by each convolution block, wherein the target input images or the target feature maps of the part have a specific step interval therebetween, or convoluting a part of the plurality of target input images or target feature maps by each convolution block, wherein a correlation between the target input images or the target feature maps of the part processed by one convolution block is higher than a threshold, or the target input images or the target feature maps of the part processed by one convolution block are multiple preset target input images or target feature maps having a correlation.

It should be noted that the correlation between channels can be manually selected, or can be measured by statistically calculating the distance between the input sub-channels (for example, Euclidean distance), or can be obtained by calculating a co-correlation matrix.

In some embodiments, the processing module 230 is configure to convolute a part of the plurality of target input images or target feature maps by each convolution block, wherein the target input images or the target feature maps of the part have a specific step interval therebetween, by:

dividing the target input images or the target feature maps into R groups of target input images or target feature maps, wherein R is an integer, the target input images or the target feature maps in each group have a step interval R therebetween, and wherein the R groups of target input images or target feature maps do not overlap;

convoluting each group of target input images or target feature maps to obtain a corresponding output feature map, wherein a first target input image or a first target feature map of the t-th group of target input images or target feature maps is the t-th target input image or target feature map, where t∈[0,R−1]; and wherein the i-th target input image or the i-th target feature map of the t-th group of target input images or target feature maps is the (i*R+t)th target input image or the (i*R+t)th target feature map in all target input images or target feature maps, wherein i is a non-negative integer.

R may be determined in any manner, such as by default, as specified by the user-operator or by some other rule, and embodiments of the present disclosure are not limited by the specific manner in which R is determined.

In some embodiments, the processing module 230 is configured to convolute at least part of the plurality of target input images or target feature maps by each weighted convolution block by:

convoluting the target input images or target feature maps by each convolution block according to the following formula:

$$S_i = \sum_{p=0}^{P} w_{i,p} Conv_{i,p}(M_p)$$

wherein Si represents the i-th output feature map, $Conv_{i,p}(M_p)$ represents the convolution operation on the p-th target input image or target feature map MP by the i-th convolution kernel, $w_{i,p}$ represents a weight for the i-th convolution kernel corresponding to the p-th target input image or target feature map, and P represents the total number of the target input images or target feature maps.

In some embodiments, the processing module 230 is configured to convolute at least part of the plurality of target input images or target feature maps according to information differences of the plurality of target input images or the target feature maps by:

computing the information differences of the plurality of target input images or target feature maps according to the following formula:

$$OS_p = M_p - M_b$$

wherein $M_p$ represents the p-th target input image or target feature map, $M_b$ represents a mapped reference target input image or target feature map, and $OS_p$ is offset information of the p-th target input image or target feature map, the reference target input image or target feature map being the converted first target input image or target feature map.

Figure 3:
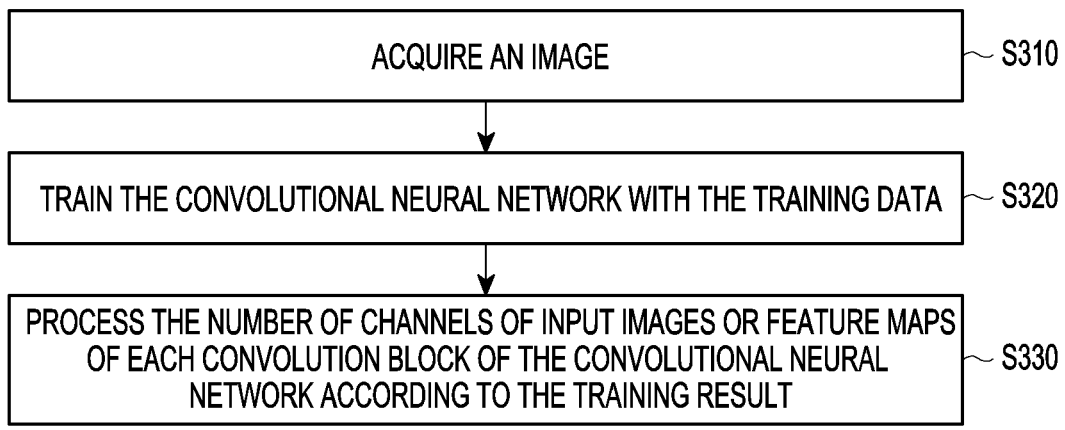
FIG. 3 illustrates a schematic flow chart of a method of training a convolutional neural network according to an embodiment of the present disclosure.

After the interlaced space module reduces the resolution and the up resolution module restores the resolution, the network may need to be retrained due to changes in the network model structure. Accordingly, the present disclosure provides a method of training the convolutional neural network. FIG. 3 illustrates a schematic flow chart of a method of training a convolutional neural network according to an embodiment of the present disclosure. As shown in FIG. 3, the method includes:

at step S310, obtaining training data;

at step S320, training the convolutional neural network with the training data; and at step S330, adjusting the number of channels of input images or feature maps of each convolution block of the convolutional neural network according to the training result; wherein, for a K-th convolution block, if the number of channels of input images or feature maps of the K-th convolution block before adjustment is $M_k$, the number of channels of input images or feature maps of the K-th convolution block after adjustment is $\lambda_k M_k$, and $\lambda_k$ is an expansion coefficient.

In some embodiments, if the adjustment does not increase the number of channels and convolution kernel, the corresponding convolution kernel follows the convolution method before the adjustment and convolutes all the input channels.

In some embodiment, if the adjustment increases the number of channels and convolution kernels, all newly added input channels are convoluted or all input channels are convoluted.

In some embodiments, adjusting the number of channels of input images or feature maps of each convolution block of the convolutional neural network according to the training result includes:

setting the expansion coefficient to $\lambda = [\lambda_0, \lambda_1, \ldots, \lambda_L]$, wherein L represents the number of convolution blocks, $\lambda_0 = \lambda_1 = \ldots = \lambda_L$ and $\lambda$ becomes a scalar super parameter;

determining an adjustment step size of $\lambda$ to obtain a new sequence of $\lambda$, $\lambda^0, \lambda^1, \ldots \lambda^s$] wherein each $\lambda^s$ (s ∈ [0, S]) is an L-dimensional vector, $\lambda^s = [\lambda_0^s, \lambda_1^s, \ldots, \lambda_L^s]$, and $\lambda^s < \lambda^v$ if s<v, where v ∈ [0, S];

calculating a corresponding performance gain for each $\lambda^s$:

$$G^{s-1} = \frac{A^s - A^{s-1}}{|\lambda^s - \lambda^{s-1}|}$$

wherein the performance gain $G^{s-1}$ is a scalar, and $A^s$ represents the performance of the obtained model corresponding to $\lambda^s$; and calculating a finally selected expansion coefficient A based on the following formula:

$$\lambda = \underset{\lambda^s}{\operatorname{argmax}}(G^s \geq G_{thr})$$

wherein $G_{thr}$ is a threshold value, whose value is a predetermined constant value or the performance gain of the convolutional neural network before adjustment that corresponds to the expansion coefficient A being a unit vector, and argmaxxs(·) represents the value of $\lambda^s$ when the expression in the parentheses is the largest.

During training, although it may be necessary to adjust the number of feature maps of each convolution block, in general, the range of variation of the number of feature maps is limited, and thus the increase or decrease of additional calculation amount so caused is also limited, thereby it may achieve calculation acceleration of the entire model.

The output resolution can be enlarged by enlarging the resolution of the feature map output from any one or more convolution blocks of the convolutional neural network, so that the resolution of the feature map output from the convolutional neural network to a resolution that is obtained by only processing the input image in the convolutional neural network, to restore the resolution.

For example, for a convolutional neural network comprising P convolution blocks, the large-resolution input channel of the Con1 convolution block of the convolutional neural network can be converted into multiple small-resolution input channels, thereby reducing the calculation amount of the Con1~ConP convolution blocks while maintaining information integrity. After that, the resolution of the output channel of the Con(P−1) convolution block can be enlarged, thereby enlarging the resolution of the output of the entire convolutional neural network, to achieve resolution recovery. The example is given only as an exemplary illustration, and the image processing device and method of the present disclosure are not limited to the input channel resolution reduction of the Con1 convolution block and the output channel resolution improvement of the Con(P−1) convolution block.

Figure 4:
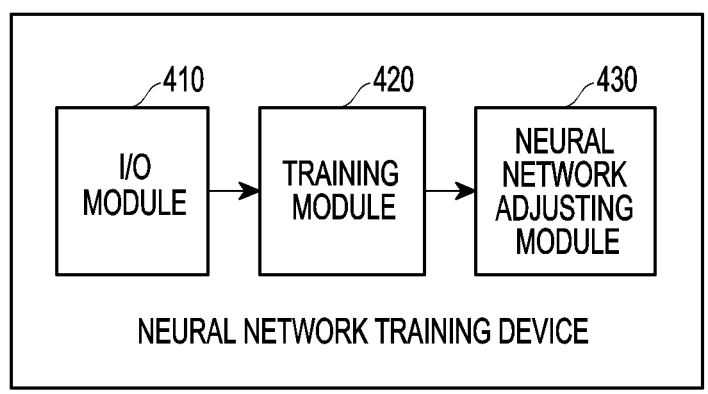
FIG. 4 illustrates a schematic block diagram of a neural network training device that trains a convolutional neural network according to an embodiment of the present disclosure.

The present disclosure further provides a device of training a convolutional neural network. FIG. 4 illustrates a schematic block diagram of a neural network training device that trains a convolutional neural network according to an embodiment of the present disclosure. As shown in FIG. 4, the device includes:

an I/O module 410 configured to obtain training data;

a training module 420 configured to train the convolutional neural network with the training data; and a neural network adjusting module 430 configured to adjust the number of channels of input images or feature maps of each convolution block of the convolutional neural network according to the training result; wherein, for a K-th convolution block, if the number of channels of input images or feature maps of the K-th convolution block before adjustment is $M_k$, the number of channels of input images or feature maps of the K-th convolution block after adjustment is $\lambda_k M_k$, and $\lambda_k$ is an expansion coefficient.

In some embodiments, if the adjustment does not increase the number of channels and convolution kernel, the corresponding convolution kernel follows the convolution method before the adjustment and convolutes all the input channels.

In some embodiment, if the adjustment increases the number of channels and convolution kernels, all newly added input channels are convoluted or all input channels are convoluted.

In some embodiments, the neural network adjusting module 430 is configured to:

set the expansion coefficient to $\lambda=[\lambda_0, \lambda_1, \ldots, \lambda_L]$, wherein L represents the number of convolution blocks, $\lambda_0=\lambda_1=\ldots=\lambda_L$, and $\lambda$ becomes a scalar super parameter;

determine an adjustment step size of to obtain a new sequence of $\lambda$, $[\lambda 0, \lambda 1, \ldots, \lambda^s]$ wherein each $\lambda^s$ (s ∈ [0, SD is an L-dimensional vector, $\lambda^s=[\lambda_0^s, \lambda_1^s, \ldots, \lambda_L^s]$, and $\lambda^s<\lambda^v$ if s<v ∈ [0, S];

calculate a corresponding performance gain for each $\lambda^s$:

$$G^{s-1} = \frac{A^s - A^{s-1}}{|\lambda^s - \lambda^{s-1}|}$$

wherein the performance gain $G^{s-1}$ is a scalar, and $A^s$ represents the performance of the obtained model corresponding to $\lambda^s$; and calculate a finally selected expansion coefficient $\lambda$ based on the following formula:

$$\lambda = \underset{\lambda^s}{\operatorname{argmax}}(G^s \geq G_{thr})$$

wherein $G_{thr}$ is a threshold value, whose value is a predetermined constant value or the performance gain of the convolutional neural network before adjustment that corresponds to the expansion coefficient $\lambda$ being a unit vector, and $\operatorname{argmax}_{\lambda_s}(\cdot)$ represents the value of $\lambda^s$ when the expression in the parentheses is the largest.

Figure 5:
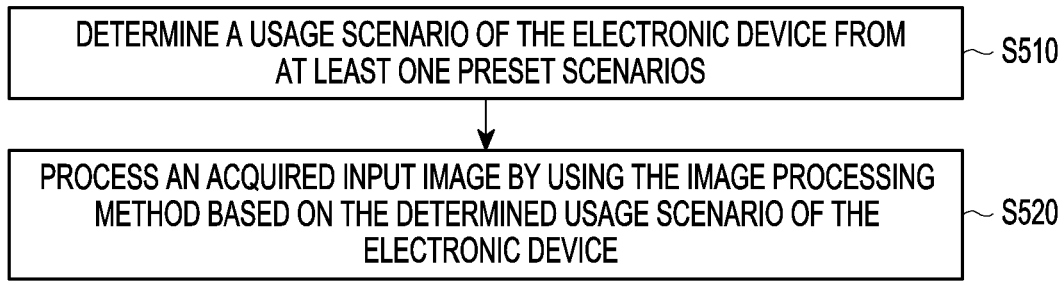
FIG. 5 illustrates a schematic flow chart of an image processing method used in an electronic device according to an embodiment of the present disclosure.

The image processing method provided by the embodiments of the present disclosure can be used in various electronic devices and applied to various usage scenarios. FIG. 5 illustrates a schematic flow chart of an image processing method used in an electronic device according to an embodiment of the present disclosure. In particular, as shown in FIG. 5, the method includes:

step S510 of determining a usage scenario of the electronic device from at least one preset scenarios; and step S520 of processing an acquired input image by using the image processing method of the above aspect based on the determined usage scenario of the electronic device, wherein the number of the plurality of target input images or target feature maps is based on the determined usage scenario of the electronic device.

Figure 6:
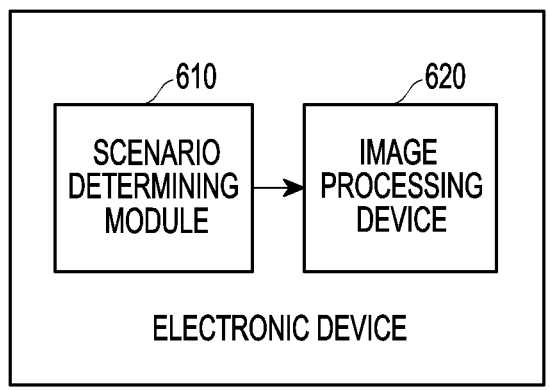
FIG. 6 illustrates a schematic block diagram of an electronic device according to an embodiment of the present disclosure.

According to an embodiment of the present disclosure, an electronic device corresponding to the method shown in FIG. 3 is provided. FIG. 6 illustrates a schematic block diagram of an electronic device according to an embodiment of the present disclosure. In particular, as shown in FIG. 6, the device includes:

a scenario determining module 610 configured to determine a usage scenario of the electronic device from at least one preset scenarios; and an image processing device 620 configured to process an acquired input image based on the determined usage scenario of the electronic device, wherein the number of the plurality of target input images or target feature maps is based on the determined usage scenario of the electronic device.

The image processing device 620 may be the image processing device as shown in FIG. 2.

The specific process of image processing based on convolutional neural networks according to the present disclosure will be described below with reference to FIGS. 7-15.

One of the purposes of the present disclosure is to accelerate convolutional neural networks. Convolutional neural networks may include various convolutional neural network structures, such as various network structures for image-level classification tasks, region-level detection tasks, and pixel-level segmentation tasks. Neural networks with different tasks have some special structures. For example, as for neural networks for classification, the last two layers may be fully connected layers. The networks for detection tasks may end up with different branches for multitasking. The networks for segmentation tasks not only contain a coding network, and may also include a decoding network with a higher resolution, a jump connection between the front and back layers, a hole convolution, a pyramid network layer, and the like. In this embodiment, a classical network structure is taken as an example for description. In fact, the present disclosure is applicable as long as the main part of the network architecture is a convolutional neural network.

In the following description, for the sake of brevity of description, in some embodiments, the technical solution of the present disclosure will be described mainly for an input image or a target input image. It should be noted, however, that if not specifically stated or if there is no conflict, the technical solution described for the input image or the target input image is equally applicable to the feature map of the input image or the target feature map.

Figure 7:
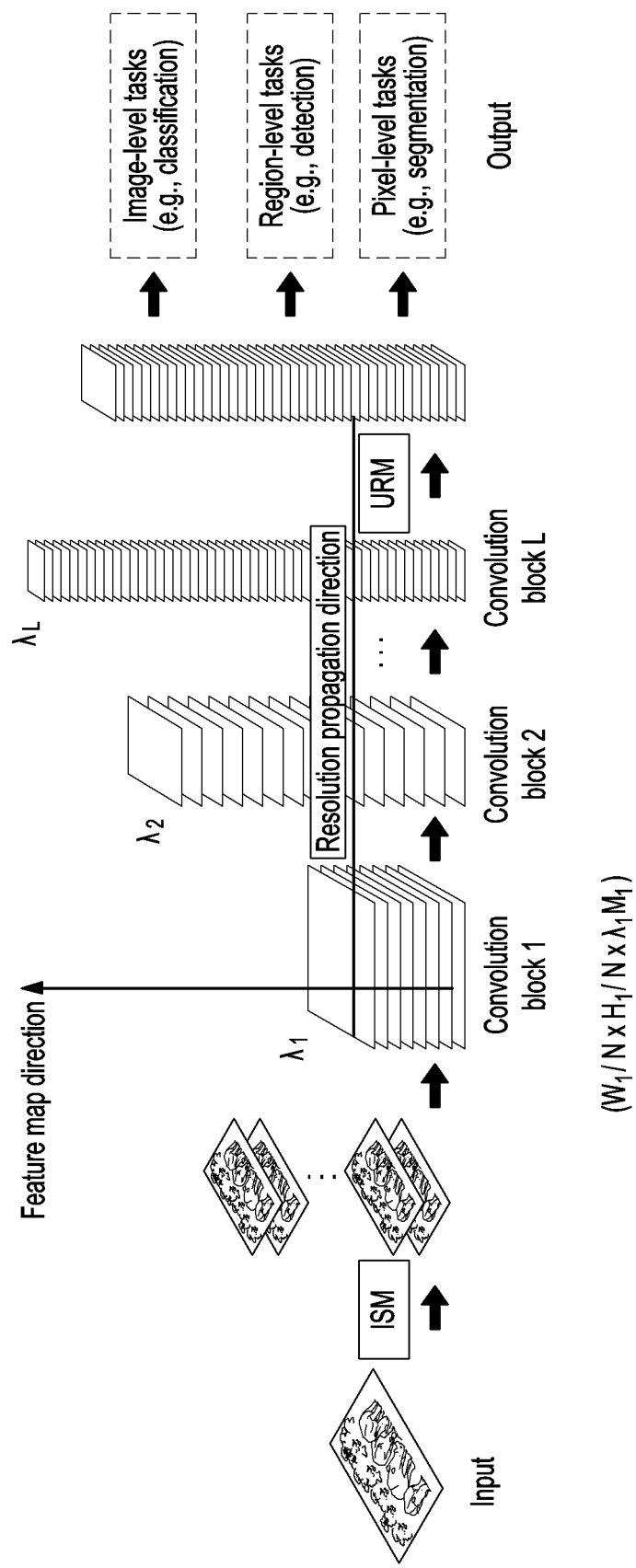
FIG. 7 illustrates a schematic diagram of the structure of a convolutional neural network according to an embodiment of the present disclosure.

FIG. 7 illustrates a schematic diagram of the structure of a convolutional neural network according to an embodiment of the present disclosure. The convolutional neural network includes an input module, an ISM (Interlaced Space Module) module, a number of convolution blocks, a URM (Up Resolution Module) module, and an output module. The method shown in FIG. 1 will be described below based on the convolutional neural network shown in FIG. 7.

The input module receives an input image in step S110. This image is input to the subsequent network.

The ISM module converts the input image into a plurality of target input images in step S120, wherein the resolution of each of the plurality of target input images is smaller than the resolution of the input image, and the pixels at the same position in each of the target input images are of a neighborhood relationship in the input image.

Figure 8:
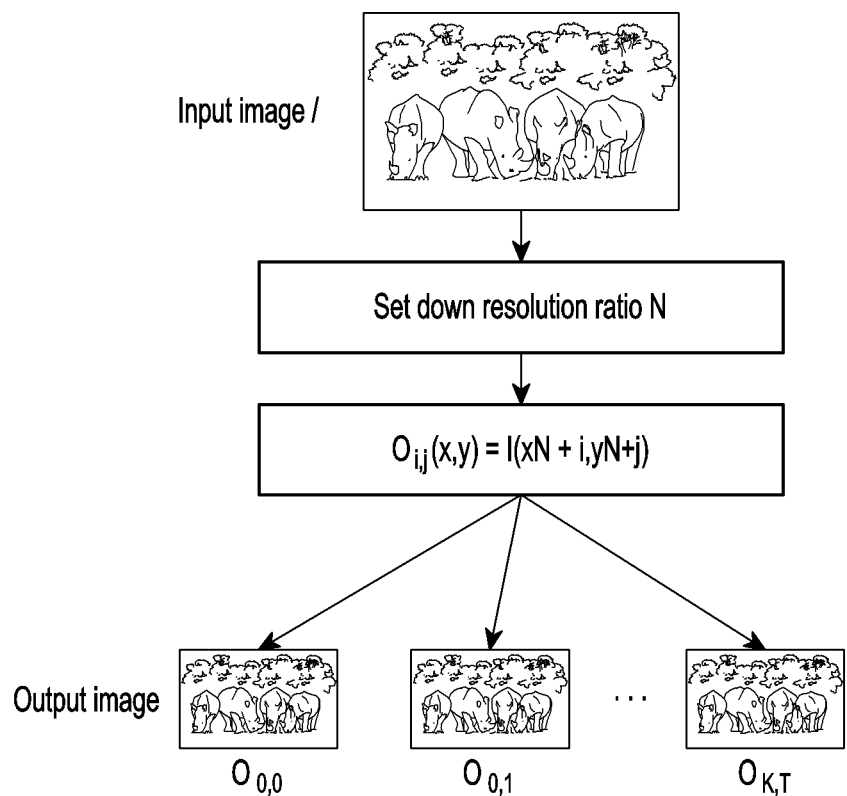
FIG. 8 is a schematic diagram of a process of converting an input image or a feature map of an input image according to an embodiment of the present disclosure.
Figure 9:
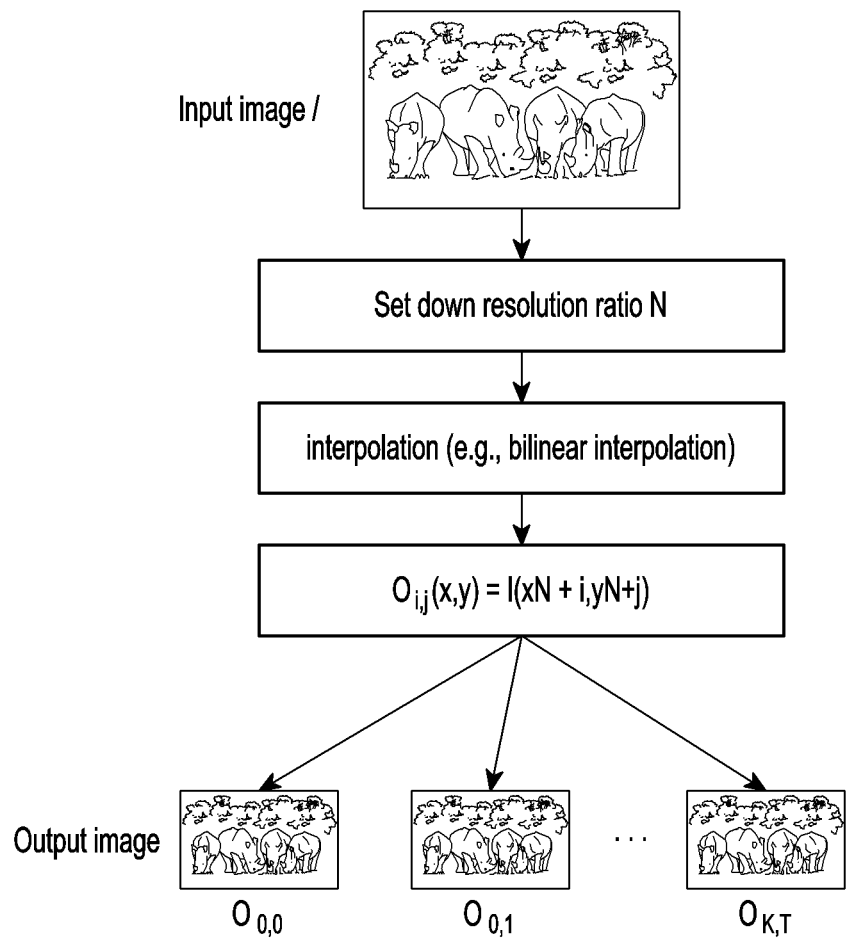
FIG. 9 is a schematic diagram of another process of converting an input image or a feature map of an input image according to an embodiment of the present disclosure.

As shown in FIG. 8 and FIG. 9, without loss of generality, taking the input image as an input channel as an example (if the input image is a plurality of input channels, each channel processing flow is the same as a single channel), the specific operation of step S120 is described. The input channel resolution size is width (W)*height (H).

Firstly a down resolution ratio N is determined. The down resolution ratio N is a parameter indicating a resolution reduction ratio between the target input image and the input image, and can be implemented by any feasible means. For example, $$N = \frac{\text{width of the target input image}}{\text{width of the input image}}.$$

However, the technical solution of the embodiments of the present disclosure is not limited thereto. For example, a height ratio between images may be employed instead of a width ratio to characterize N, or a feature capable of reflecting the resolution reduction between the target input image and the input image may be used to calculate N. N may be an integer or a non-integer.

Then a number F*F of the target input images is determined according to the down resolution ratio N, wherein $$F = U(N)$$

U(·) is a ceiling function.

Finally, the input image is converted into a number F*F of the target input images.

For example, the number F*F of target input images can be obtained by down-sampling the input image with a step size of N. The sampling formula is:

$$O_{i,j}(x,y) = I(xN+i, yN+j)$$

$$W' = L(W/N)$$

$$H' = L(H/N)$$

wherein I and O represent the input image and the target input image, respectively, and i and j are indexes established for the plurality of converted target input images, and $i \in [0,F)$, $j \in [0,F)$, x and y are abscissa and ordinate of a pixel in a corresponding target input image, respectively, and $x \in [0,W')$, $y \in [0,H')$, W'=L(W/N), H'=L(H/N), xN+i and yN+j are indexes of a pixel in the input image, U( ) represents a ceiling function, L(·) represents a floor function, and W and H represent the width and height of the input image, respectively, W' and H' represent the width and height of the target input image, respectively.

FIG. 8 is a schematic diagram of a process procedure for converting the input image according to an embodiment of the present disclosure. As shown in FIG. 8, the process includes: determining a down resolution ratio N between the input image and the target input image; when N is a non-integer, the index of the original image xN+i, yN+j to be converted are also non-integers. In order to accurately obtain the pixel value, an interpolation algorithm can be used to obtain the corresponding pixel value from the original image. For example, a bilinear interpolation algorithm can be used; then, according to the sampling formula, a number F*F of target input images are obtained, and the sampling formula is:

$$O_{i,j}(x,y) = I(xN+i, yN+j)$$

FIG. 9 is a schematic diagram of another process procedure for converting the input image according to an embodiment of the present disclosure. As shown in FIG. 9, the process includes: determining a down resolution ratio N between the input image and the target input image; when N is an integer, the index of the original image xN+i, yN+j to be converted are also integers, and the pixel value can be obtained directly from the original image. In particular, according to the sampling formula, a number F*F of target input images are obtained, and the sampling formula is:

$$O_{i,j}(x,y) = I(xN+i, yN+j)$$

Finally, a number F*F of converted small images are obtained. The resulting converted small image varies with N. Since N can be a non-integer, the numerical field of N is continuous, and all of the mapped small images collectively constitute an interlaced space of the original image.

The operation of the ISM module reduces the resolution of the input channel in the interlaced space while maintaining no loss of input channel information.

The plurality of target input images obtained by the conversion in step S120 are input to the convolution block, and each convolution block processes at least a part of the plurality of input target input images in step S130.

In FIG. 7, $W_i$, $H_i$ and $M_i$ are the width, height, and number of feature map channels in the i-th convolution block in the convolutional neural network, respectively. Assuming a total of L convolution blocks, namely: i∈[1,L] and is an integer. $\lambda_i M_i$ is the number of characteristic channels of the i-th convolution block in the convolutional neural network adjusted according to the embodiment of the present disclosure, and $\lambda_i$ is referred to as an expansion coefficient. Convolution blocks may contain common neural network layers, such as convolutional layers, pooling layers, and activation function layers.

Figure 10:
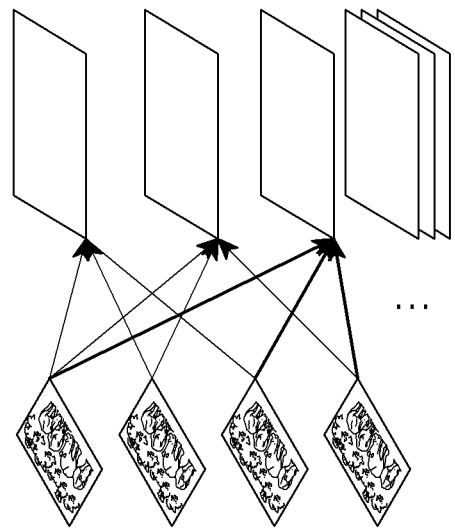
FIG. 10 is a schematic diagram of some convolution approaches used according to an embodiment of the present disclosure.
Figure 10:
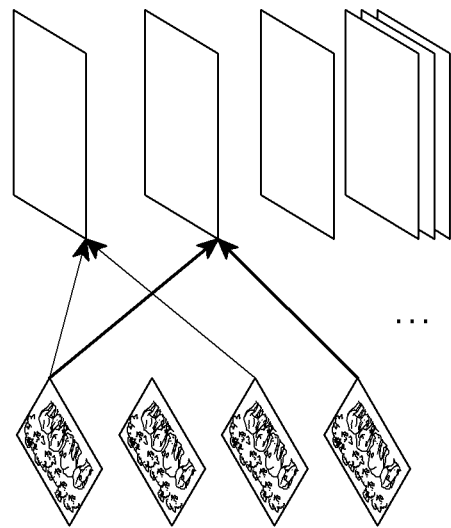
Figure 10:
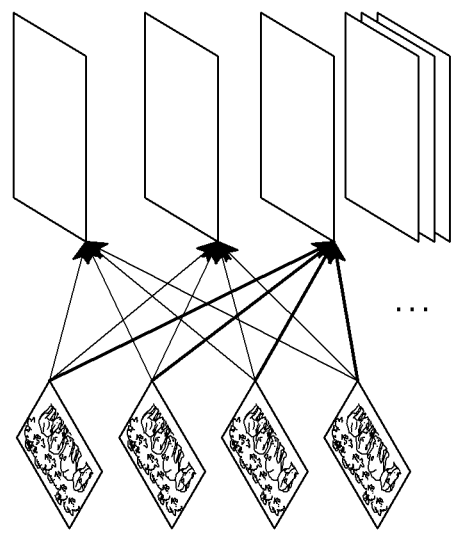
Figure 11:
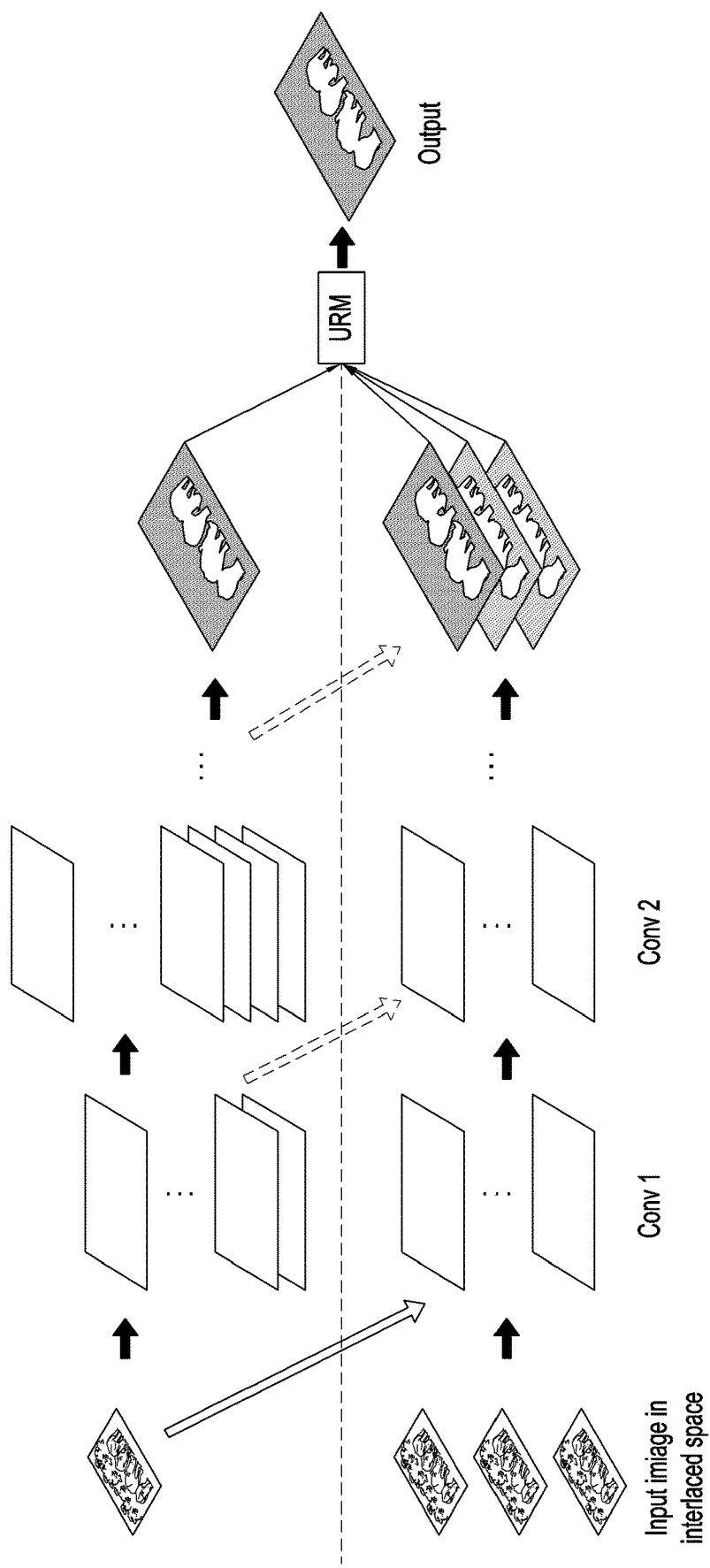
FIG. 11 is a schematic illustration of another convolutional approach used according to an embodiment of the present disclosure.

The processing in step S130 can be performed by a variety of different convolution methods, four of which are described below: packet cross-convolution, correlated channel convolution, channel weighted convolution, and offset features learned convolution. The first three convolution methods emphasize the influence of the important input channels, which alleviate the influence of the unimportant input channels. The present disclosure collectively refers the first three convolution methods as an interlaced-space-based sparse channel convolution, as shown in FIG. 10 and FIG. 11. The left graph in FIG. 10 is a convolutional method of a typical convolutional neural network in the art, and the middle and right graphs are respectively an interlaced-space-based packet cross-convolution method and a related channel convolution method. FIG. 11 shows a convolution method of learning offset feature.

Specifically, the first convolution method is an interlaced-space-based packet cross-convolution method (FIG. 10). The method performs convolution processing on a part of the plurality of target input images by each convolution block, wherein the target input images of the part have a specific step interval therebetween. Since the pixels at the same position of adjacent channels in the interlaced space are very close in the original channel and the differences therebetween are very small, it is necessary to select a certain step size for the interval channel convolution. This convolution method belongs to channel sparse convolution.

In the convolution method, the target input images are divided into R groups of target input images, wherein R is an integer, the target input images in each group have a step interval R therebetween, and wherein the R groups of target input images do not overlap.

Then each group of target input images are convoluted to obtain a corresponding output feature map, wherein a first target input image of the t-th group of target input images is the t-th target input image, where t∈[0,R−1].

In the convolution method, the i-th target input image of the t-th group of target input images is the (i*R+t)-th target input image in all target input images, wherein i is a non-negative integer.

The second one is an interlaced-space-based on correlated channel convolution (the right graph in FIG. 10), which is also one of the sparse channel convolution methods. The method performs convolution processing on a part of the plurality of target input images by each convolution block, wherein a correlation between the target input images of the part processed by one convolution block is higher than a threshold, or the target input images of the part processed by one convolution block are multiple preset target input images having a correlation.

The same positions of the sub-channels obtained by mapping the original input channel in the interlaced space are different in the original picture, and some of the channels are more closely related. For some tasks, e.g., super resolution tasks, the convolution between adjacent channels is more important. Therefore, it is necessary to preserve the convolution between these related channels. For some tasks, it is not necessary to perform the convolution between channels that are correlated closely. T groups of input channels can be selected according to the importance of the correlation between the input channels (for example, above a certain threshold) and the application. The convolution can be performed within each group of input channels, and correspondingly, the output channel is also divided into T groups. The output channel of group t (t∈[0,T−1]) only convolutes the relevant input channel of group t.

It should be noted that the correlation between channels can be manually selected, or can be measured by statistically calculating the distance between the input sub-channels (for example, Euclidean distance), or can be obtained by calculating a co-correlation matrix.

The third one is an interlaced-space-based channel weighted convolution method. The method performs convolution processing on at least a part of the plurality of target input images by each weighted convolution block. Specifically, for example, each convolution block convolutes at least part of the plurality of target input images by weight by convoluting the target input images or target feature maps by each convolution block according to the following formula:

$$S_i = \sum_{p=0}^{P} w_{i,p} Conv_{i,p}(M_p)$$

wherein $S_i$ represents the i-th output feature map, $Conv_{i,p}(M_p)$ represents the convolution operation on the p-th target input image MP by the i-th convolution kernel, $w_{i,p}$ represents a weight for the i-th convolution kernel corresponding to the p-th target input image, and P represents the total number of the target input images.

The existing convolution method is a simple summation of the convolution result between different channels. In contrast, the above convolution method according to the embodiment of the present disclosure takes the fact that pixels at the same position of different channels in the interlaced space have a neighbor ship of different distances in the original image into account by setting corresponding weights for the channel, thereby being able to maintain the integrity of the input information.

It should be noted that the weight setting of the input channel may be shared between different output feature maps Si. For example, the output feature map is divided into T groups, and the weight settings are shared between each group. In addition, the channel weighted convolution method can be used in combination with the other convolution methods without conflict.

The fourth one is an interlaced-space-based convolution method of learning offset feature. The method processes at least part of the plurality of target input images according to information differences between the plurality of target input images. specifically, the information differences of the plurality of target input images or target feature maps is determined according to the following formula:

$$OS_p = M_p - M_b$$

wherein $M_P$ represents the p-th target input image, $M_P$ represents a mapped reference target input image, and $OS_p$ is offset information of the p-th target input image, the reference target input image being the converted first target input image.

As shown in FIG. 11, the convolution block at the upper side of the dotted line in the figure belongs to the convolution block of the original convolutional neural network, and the convolution block at the lower side of the dotted line is the new convolution block added after the expansion coefficient A is adjusted. The first input image in the interlaced space input image is sent to the convolution block of the original convolutional neural network as the reduced resolution image of the original image. It can be found that the computation at the upper side of the dotted line is equivalent to a down-sampling network of the original convolutional neural network. The network at the lower side of the dotted line is responsible for learning the offset feature. The offset feature is defined as the potential feature contained in the offset information contained in the channels in the sub-input channel of the mapped interlaced space relative to the reference channel.

It should be noted that, since the convolution method learns the offset information, the input channels based on the interlaced space can be directly set as offset information except the reference channel, which can be configured according to the effect of the specific application.

After the process of step S130, the URM module enlarges the resolution of the feature map output from one or more convolution blocks in step S140. The improved resolution may be the resolution of the convolutional neural network, i.e., the resolution that is obtained by only processing the input image in the convolutional neural network. In this way, the resolution of the output can be maintained to the level of the output resolution of the convolutional neural network; or the resolution after improvement can be even higher than that of the convolutional neural network, thereby achieving the purpose of improving the resolution of the input image while reducing the computational complexity.

As shown in FIG. 7, for a convolutional neural network including L+1 convolution blocks, a large-resolution (W, H) input image is converted into a plurality of small-resolution (W/N, H/N) target input images by an interlaced space module, and then input to the convolution block 1 of the convolutional neural network (the number and resolution of the feature map of the convolution block 1 changes; the change of the number can affect the calculation amount of the convolution block 1 and the convolution block 2; the change of the resolution can affect the calculation amount of the convolution block 1 to URM, and the affecting direction is shown as the direction in which the affection of the resolution propagates in FIG. 7), to the convolution block 2 . . . then to the convolution block L, and then the URM enlarges the resolution of the feature map output from the convolution block L of the convolutional neural network. The resolution of the feature map output from the convolutional neural network is enlarged to the resolution obtained by processing the large-resolution input image only in the convolutional neural network.

In FIG. 7, the ISM module converts the input image into a plurality of target input images, the plurality of target input images pass through one or more convolution blocks in the convolutional neural network, a feature map is output therefrom to the URM module, and the URM module enlarges the resolution. It should be noted that FIG. 7 is only an exemplary embodiment, and the positions of the ISM module and the URM module may be changed. The ISM module is not limited to being placed only before the first convolution block, and rather may be placed before any convolution block. The up resolution module can also be placed after any convolution block, as long as the constraint that the ISM module is placed before the up resolution module is satisfied. When the ISM module is located after the h-th convolution block, the ISM module converts each feature map output from the h-th convolution block into a plurality of target feature maps; when the URM module is located after the q-th convolution block, the URM module enlarges the resolution of the feature map output from the q-th convolution block. It should be noted that, because the output of the interlaced space module increases the number of input channels of the next convolution block connected to the interlaced space module, correspondingly, the number of the convolution kernels of the first layer in the convolution block should be adjusted to match the number of input channels. The weights of the newly added convolution kernels can all be set to 0 or other initialization strategies may be used.

With the technical solution according to the embodiments of the present disclosure, the required amount of calculation can be reduced, and thus the required computing resources can be saved and the image processing speed can be improved.

The amount of the calculation of the convolutional neural network can be measured by the amount of the basic multiplication and addition. Specifically, if the original neural network to be accelerated in the present disclosure includes L convolution blocks, the calculation amount is:

$$C_{old} = C_1 + C_2 + \ldots + C_{L-1} + C_L$$

wherein $C_i$ represents the amount of multiplication and addition of the i-th convolution block. The calculation amount of the neural network after the implementation of the embodiment of the present disclosure is:

$$C_{our} = N^2 * \frac{\lambda_1}{N^2} C_1 + \frac{\lambda_2}{N^2} C_2 + \ldots + \frac{\lambda_{L-1}}{N^2} C_{L-1} + \frac{\lambda_L}{N^2} C_L \leq$$
$$\frac{N^2 - 1}{N^2} \lambda_{Max} C_1 + \frac{\lambda_{Max}}{N^2} C_{old},$$

wherein $\lambda_{Max} = \max(\lambda_1, \lambda_2 \ldots \lambda_L)$, whose value is generally between [0.5, 1.5] and is much smaller than N. The above formula can be approximated as:

$$C_{our} \approx \frac{1}{N^2} C_{old}$$

It can be seen that the present disclosure can achieve approximately $N^2$ times calculation acceleration for the original neural network. In order to verify the acceleration effect of the present disclosure, the image processing time of the original network and the network accelerated by the technical solution according to the embodiment of the present disclosure are respectively tested by using a NVIDI Tesla M40 graphics card, and the test results are shown in Table 1:

TABLE 1

| | average calculation time for one image (milliseconds) |
|---|---|
| existing convolutional neural network, WIN5-RB | 298 |
| the present embodiment, WIN5-RB | 83 |

It can be seen that compared with the existing network, the image processing time of the network accelerated by the present disclosure is greatly reduced.

The above example is described with respect to an input image, however, the technical solution of this example is also applicable to a feature map of an input image, and the difference therebetween is only in whether it is an input image or a feature map of an input image that is converted into a plurality of images.

The feature map of the input image may be generated by one or more convolution blocks of the convolutional neural network. In this case, for example, the ISM module can be placed between convolution blocks of the convolutional neural network. The input image is input to a convolutional neural network, and a feature map of the input image is generated by a convolution block located before the ISM module and sent to the ISM module to generate a corresponding plurality of target feature maps.

Specifically, when the ISM module converts the feature map of the input image into a plurality of target feature maps, it firstly determines the down resolution ratio N. The down resolution ratio N can be implemented by any feasible means. For example, $$N = \frac{\text{width of the tagret fature map}}{\text{width of the feature map of the input image}}.$$

However the technical solution of the embodiments of the present disclosure is not limited thereto. For example, a height ratio between images may be employed instead of a width ratio to characterize N, or a feature capable of reflecting the resolution reduction between the target feature map and the feature map of the input image may be used to calculate N.

Then a number F*F of the target feature maps is determined according to the down resolution ratio N, wherein $$F = U(N)$$

U(·) is a ceiling function.

Finally, the feature map of the input image are converted into a number F*F of the target feature maps.

The manner of determining the number of target feature maps according to the down resolution ratio N and converting to the target feature maps is similar to the manner of determining the number of target input images according to the down resolution ratio N and converting to the target input image, and it only needs to replace the input image in the manner described for the input image with the feature map of the input image and replace the target input image with the target feature map. The details are not described herein again.

The resulting target feature map can be used for subsequent processing. The subsequent processing is as described in steps S130-S140 in FIG. 1, and details are not described herein again.

Alternatively, in other implementations, the received input image may be processed by other modules or units to generate a feature map of the input image, and the feature map of the input image is processed as shown in step S120 of FIG. 1 to generate a plurality of corresponding target feature maps, and then the operations shown in steps S130-S140 in FIG. 1 are performed.

Alternatively, after the input image has been processed by the convolutional neural network of FIG. 7, the number of feature maps of each layer may be readjusted to complete the retraining of the neural network.

Figure 12:
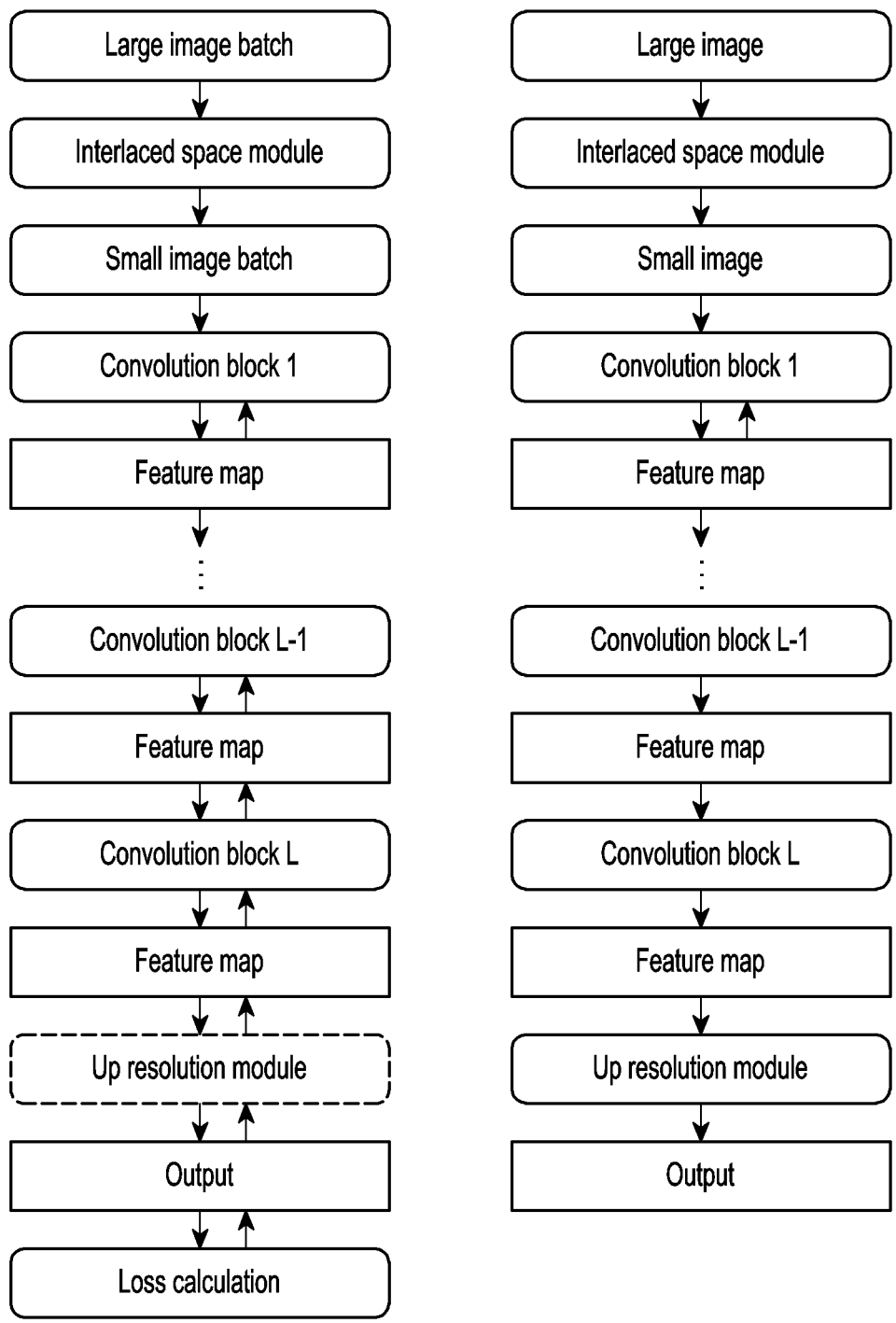
FIG. 12 illustrates a schematic diagram of a training and testing process according to an embodiment of the present disclosure.

FIG. 12 shows a schematic diagram of a training and testing process in accordance with an embodiment of the present disclosure. In FIG. 12, the left graph is the training flow chart, and the right graph is the test flow chart.

The training flow will be described below with reference to the left graph of FIG. 12. The large input image (i.e., training data) can be batch images (Batch images), which can contain several channels. When the large input image contains multiple channels, each channel of the large input image are subjected to the conversion in the interlaced space module to be converted to a plurality of small images. When the large input image contains only one channel, the large input image is subjected to the conversion in the interlaced space module to be converted to a plurality of small images. Some or all of these small images are sequentially sent to each convolution block in the convolutional network for processing, and an input feature map is obtained. Due to the resolution reduction implemented by the interaced space module, the resolution to be processed by all subsequent convolution blocks is reduced and the amount of calculation is also reduced. Since the resolution processed by the last convolution block is also reduced, in order to maintain the resolution of the output result, the embodiment of the present disclosure introduces an up resolution module to complete the maintenance of the output resolution. The resolution of the output feature map is enlarged by the up resolution module, and the output result is a feature map with the resolution enlarged. It should be noted that the interlaced space module is not limited to being placed only before the first convolution block, and rather may be placed before any convolution block. The up resolution module can also be placed after any convolution block, as long as the constraint that the ISM module is placed before the up resolution module is satisfied. When the ISM module is located after the h-th convolution block, the ISM module converts each feature map output from the h-th convolution block into a plurality of target feature maps. A loss calculation module can also be provided to calculate the loss of the output result during the test. The specific calculation method of this module is related to the specific application. For example, in a super resolution task, a Mean Squared Error (MSE) can be used to calculate the loss. It should be noted that, the training process performs a data forward propagation from the front to the back, and will also perform a gradient backward propagation from the back to the front after completing a loss calculation. In the left graph of FIG. 12, the downward arrow indicates the data forward propagation, and the upward arrow indicates the gradient backward propagation. It can be found that the interlaced space module in the graph does not perform the gradient backward propagation because the interlaced space module in this flowchart is located after the input image. If the interlaced space module is located between two convolution blocks, and the previous convolution block also needs to learn parameters, the interlaced space module needs to perform the gradient backward propagation.

By retraining the neural network, the number of feature maps for each convolution block can be re-adjusted. This operation is illustrated by the light colored feature maps at each of the convolution blocks in FIG. 7. In the adjustment, the expansion coefficient corresponding to the convolution block 1 is $\lambda_1$, the expansion coefficient corresponding to the convolution block 2 is $\lambda_2$, and the expansion coefficient corresponding to the convolution block L is $\lambda_L$, and so on.

As shown in FIG. 7 and FIG. 12, in order to achieve resolution recovery of the convolutional neural network, the output resolution of the last convolution block L of the convolutional neural network can be enlarged, thereby improving the resolution of the output of the entire convolutional neural network. Specifically, the resolution of the output may be enlarged by using a reverse convolution, a reverse pooling layer, and interpolation, and also in a manner opposite to the interlacing conversion in the interlaced space module, such as a stitch conversion method (as shown in FIG. 14).

Figure 14:
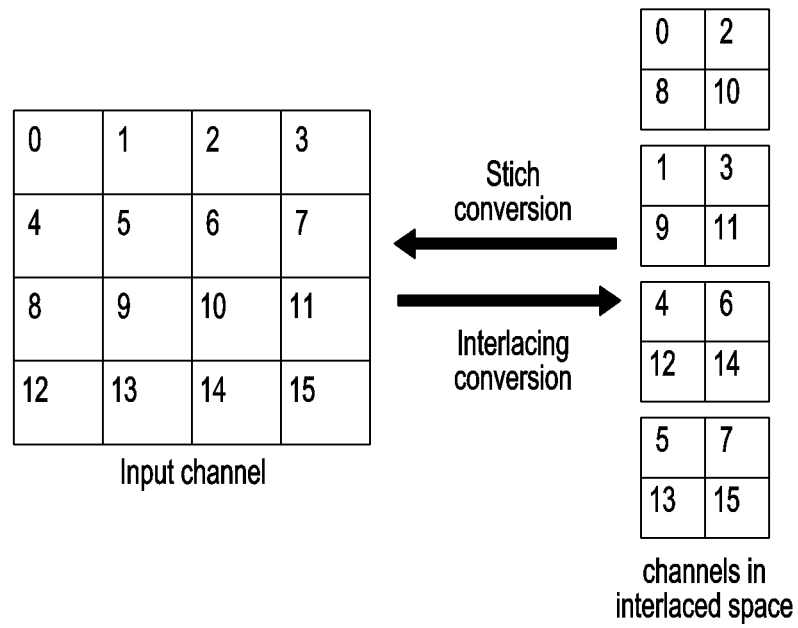
FIG. 14 is a schematic diagram of a method of converting an input image/feature map into a target input image/target feature map according to an embodiment of the present disclosure.

For example, the resolution of the input channel shown in FIG. 14 is 4*4, which is mapped by the interlacing conversion to four small resolution channels of 2*2. The stitching method up resolution module maps the small resolution channel to the original resolution channel, and the mapping rule is:

$$I(x, y) = 0_{x\%N, y\%N}\left(\frac{x}{N}, \frac{y}{N}\right)$$

wherein x % N represents the remainder obtained by dividing x by N.

If the up resolution module URM is located between multiple convolution blocks, when the number of channels output by the URM module is different from the number of the original input channels of the next convolution block, the convolution kernel (if the layer is a convolutional layer) of the first layer in the next convolution block needs to be adjusted to match the new number of input channels. The adjusted convolution kernel completes the weight learning again during subsequent offline re-training.

The retraining and channel adjustment process can be specifically as follows.

As shown in FIG. 7, the number of feature map channels of the i-th layer of the original network is defined as $M_i$, and the number of feature map channels of the adjusted network is defined as $\lambda_i M_i$, wherein $\lambda_i$ is called an expansion coefficient, and the larger $\lambda_i$ is, the more feature map channel that need to be added. Experiments have shown that as the performance curve rises, it gradually enters the flat zone, and the expansion coefficient is recommended to be between 0.5 and 1.5. In the embodiment of the present disclosure, it usually takes $\lambda_i < N$ to balance the calculation efficiency and the performance. After determining the expansion coefficient, the network is retrained offline, and the original network weight can be selected as the pre-training model of the new network.

In order to explain the adjustment of the super parameter $\lambda=[\lambda_0, \lambda_1, \ldots, \lambda_L]$ of the expansion coefficient of the feature map, the present disclosure uses the model MobileNetV2 as an example. In this model, the expansion coefficients of the layers are set to be the same, so that the number of channels of all layers can be controlled by a global scalar A (similar to the meaning of the expansion coefficient in the present disclosure). For the relationship between model performance and the expansion coefficient, it may make reference to FIG. 15. Here, it is assumed that the resolution of the input image of the original convolutional neural network (shown as the original network in FIG. 15) is 224*224, and $\lambda=1$ is the number of channels selected for tradeoff between the original model speed and the performance, e.g., $\lambda_1 M_i = M_i$.

It can be seen from the figure that the performance curve enters the flat zone when $\lambda>1$, and the increase of the number of channels no longer has a significant contribution to the network performance. This is also the reason why the number of channels of the original convolutional neural network is selected as $\lambda=1$. The resolution of the input image of the original convolutional neural network is directly reduced to 128*128 to obtain a down-sampling network. The performance of the network is lower than the original network when A is the same. In addition to the flat zone, the increase of $\lambda$ generally contributes to the performance improvement of the downsampling network. For example, the downsampling network with $\lambda=1$ is better than the original convolutional neural network with $\lambda=0.5$. However, A selected by the original convolutional neural network is often at the front of the flat zone. At this time, due to the information loss of the down-sampled network and the existence of the flat performance zone, it is difficult for the performance of the down-sampling network to catch up with the one of original convolutional neural network.

Figure 15:
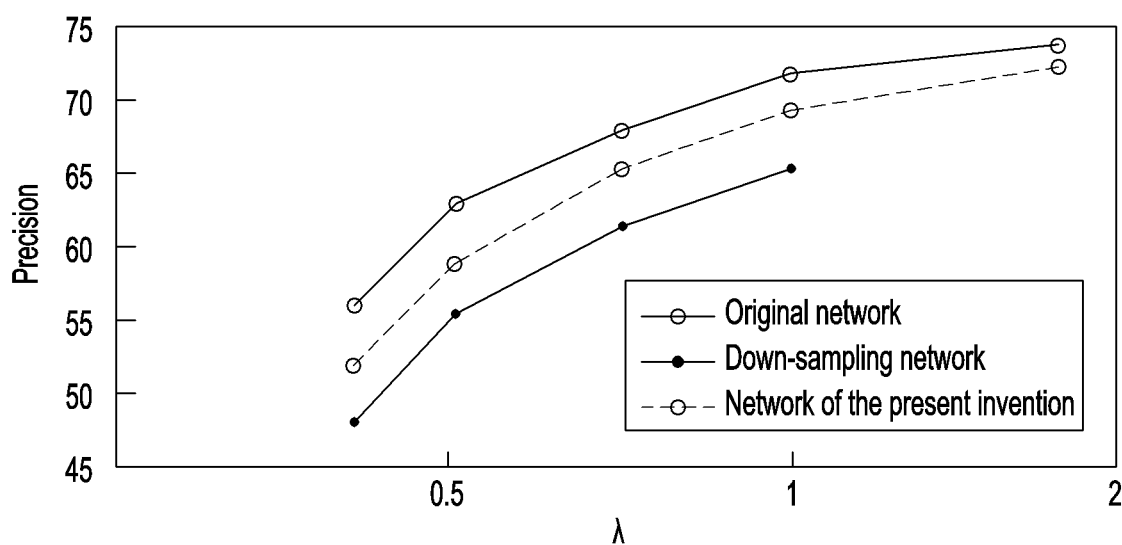
FIG. 15 is a schematic diagram of the relationship between model performance and an expansion coefficient according to an embodiment of the present disclosure.

In FIG. 15, the present disclosure reduces the input resolution as the same extent as the down-sampling network, but unlike the down-sampling network, the present disclosure has no information loss. The performance expected by the network obtained by the present disclosure is between the original convolutional neural network and the down-sampled convolutional neural network, and the potential performance upper limit is the same as that of the original convolutional neural network due to the lossless of input information. The parameter A can be adjusted to be constant, or appropriately adjusted to be more or less to trade off the speed and the performance. According to FIG. 15, A should be adjusted in a small interval, or even not adjusted due to the existence of the flat performance zone and the sharp decrease in the performance at $\lambda<1$, and the recommended selection interval is between [0.5, 1.5].

In order to determine the best expansion coefficient $\lambda$, the embodiment of the present disclosure proposes a method for automatically determining the parameter $\lambda$, which is also called as a performance gain threshold based method. The method includes the following sub-steps:

sub-step 1 of setting the expansion coefficient to $\lambda=[\lambda_0, \lambda_1, \ldots, \lambda_L]$, wherein L represents the number of convolution blocks, $\lambda_0=\lambda_1= \ldots =\lambda_L$, and A becomes a scalar super parameter;

sub-step 2 of determining an adjustment step size of $\lambda$ to obtain a new sequence of $\lambda$, $[\lambda^0, \lambda^1, \ldots, \lambda^S]$, wherein each $\lambda^s$ (s ∈ [0, S]) is an L-dimensional vector, $\lambda^s=[\lambda_0^s, \lambda_1^s, \ldots, \lambda_L^s]$ and $\lambda^s<\lambda^v$ if s<v, where v ∈ [0, S];

sub-step 3 of calculating a corresponding performance gain for each $\lambda^s$:

$$G^{s-1} = \frac{A^s - A^{s-1}}{|\lambda^s - \lambda^{s-1}|}$$

wherein the performance gain $G^{s-1}$ is a scalar, and $A^s$ represents the performance of the obtained model corresponding to $\lambda^s$; and sub-step 4 of calculating a finally selected expansion coefficient $\lambda$ based on the following formula:

$$\lambda = \underset{\lambda^s}{\operatorname{argmax}}(G^s \geq G_{thr})$$

wherein $G_{thr}$ is a threshold value, whose value is a predetermined constant value or the performance gain of the convolutional neural network before adjustment that corresponds to the expansion coefficient λ being a unit vector, and argmax$_{\lambda_s}(\cdot)$ represents the value of $\lambda^s$ when the expression in the parentheses is the largest.

It should be noted that, as the expansion coefficient is adjusted, the convolution manner of the newly added channels of feature maps may adopt the convolution methods introduced in step S130, as described above.

The training flow will be described below with reference to the right graph of FIG. 12. The large input image (i.e., training data) can be batch images (Batch images) or a single image. The large input image can contain several channels. When the large input image contains multiple channels, each channel of the large input image are subjected to the conversion in the interlaced space module to be converted to a plurality of small images. When the large input image contains only one channel, the large input image is subjected to the conversion in the interlaced space module to be converted to a plurality of small images. For the processing of batch images, it is a simple extension of the processing of a single image, and will not be described here. Some or all of these small images are sequentially sent to each convolution block in the convolutional network for processing, and an input feature map is obtained. The resolution of the output feature map is increased by the up resolution module, and the output result is a feature map with larger resolution. The intermediate processing modules, and the training and testing process are the same, and will not be described here.

During training, if the stitching method described later in the embodiment of the present disclosure is used to enlarge the resolution, since the loss function applied to the original convolutional neural network can be directly used on the expanded small-resolution output, it is not necessary to add the up resolution module, but this module will be required for testing.

Figure 13:
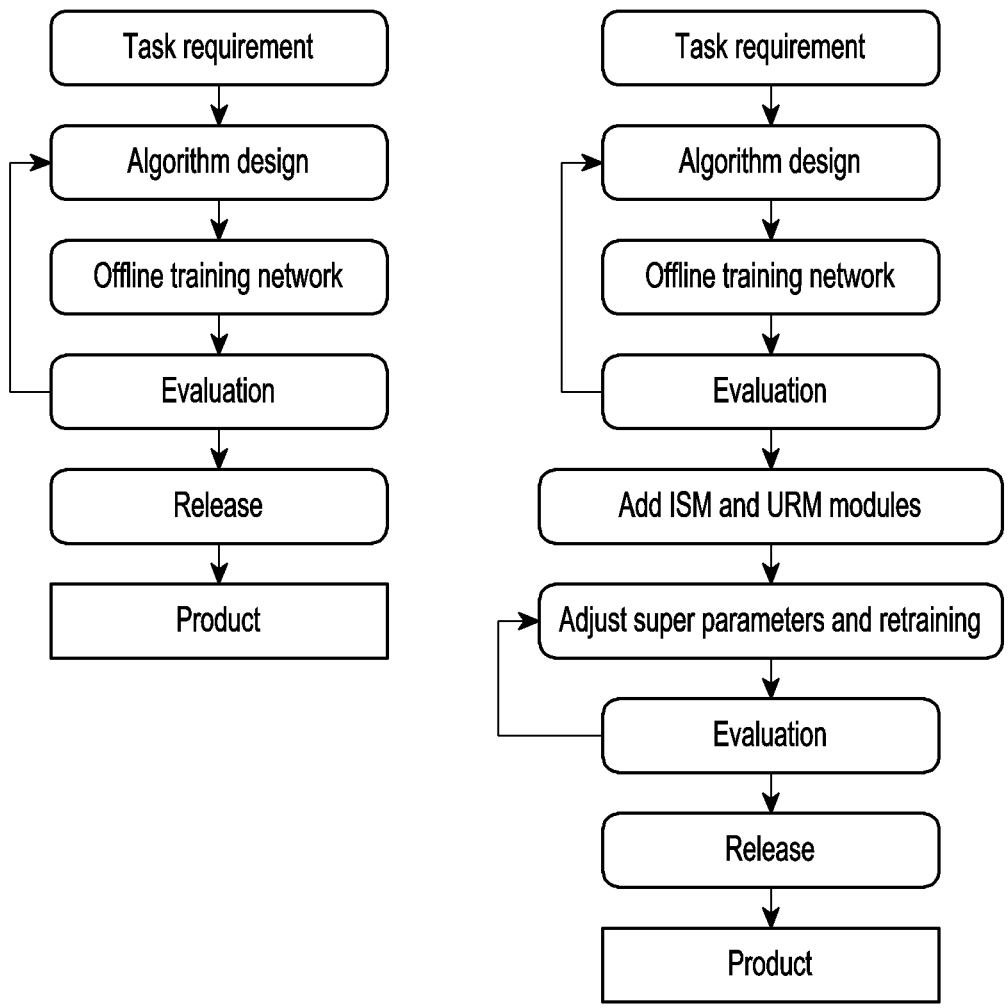
FIG. 13 shows a comparison about the development flow between the neural network model of the present disclosure and the existing convolutional neural network.

In the present disclosure, the development flow of the neural network model of the present disclosure is also different from the one of the existing convolutional neural network. FIG. 13 shows a comparison about the development flow between the neural network model of the present disclosure and the existing convolutional neural network. As shown in FIG. 13, the left graph is an existing convolutional neural network development flow, and the right graph is a development flow of the method and device of the present disclosure. Compared with the development flow of the existing convolutional neural network, the method according to the embodiments of the present disclosure may embed the interlaced space module and the up resolution module in the convolutional neural network after evaluations (for example, after determining the down resolution ratio N). Then, the re-adjustment of the number of the model feature maps and offline retraining are executed. The flow before "add ISM and URM modules" in the right graph of FIG. 13 is the flow of designing the target convolutional neural network, the processing flow starting from "add ISM and URM modules" is the processing flow to improve the target neural network according to the embodiment of the present disclosure. It should be noted that the super parameters in the process of "adjust super parameters and re-training" include the parameters such as the down resolution ratio N and the expansion coefficient $\lambda_i$. The evaluation, super parameter adjustment and re-training is an iterative optimization process. Retraining refers to offline retraining. The retraining can use the weight for the convolutional neural network when the IMS and URM modules are not added as the pre-training weight.

In an embodiment of the present disclosure, the down resolution ratio N may be an adjustable adaptive parameter (according to the configuration of the hardware operating environment, an appropriate N is adaptively selected to be applicable to a wider variety of computing platforms), which may be used for trade-offs between the performance and the speedup. Specifically, the down resolution ratio N may be determined manually, or selected according to the hardware resource environment, but the disclosure is not limited thereto.

The image processing method according to the embodiment of the present disclosure can be applied to various scenes. FIG. 5 illustrates a schematic flow chart of an image processing method used in an electronic device according to an embodiment of the present disclosure. As shown in FIG. 5, the method includes the following steps.

At step S510, it is determined a usage scenario of the electronic device from at least one preset scenarios.

The above scenarios may be classified into low-light scenes (such as night scenes), high-light scenes, etc., or may be classified into high ISO scenes, medium ISO scenes, low ISO scenes, etc., or may be classified into super resolution scenes and non-super resolution scenes, etc. The specific classification may depend on the type of the electronic device and its particular use, and embodiments of the present disclosure are not limited by the specific usage scenario classification.

At step S520, an acquired input image is processed by using the image processing method described in conjunction with FIG. 1 based on the determined usage scenario of the electronic device, wherein the number of the plurality of target input images in the image processing method described in conjunction with FIG. 1 is based on the determined usage scenario of the electronic device.

The method is further described below in specific scenarios. It is to be noted that only certain specific usage scenarios are shown below, and it should not be construed as limiting the application of the technical solutions according to the embodiments of the present disclosure.

In some embodiments, a usage scenario of de-noising images of a nighttime captured by a mobile phone will be described.

When a user of a mobile phone takes photos in different scenes, the noises included are different due to the influence of the light, hardware and the like. The computation resources of mobile phones are limited, and the deep-learning-based de-noising model is a complex pixel-level task, which leads to a heavy response delay. However, the user is more sensitive to the camera response speed when taking pictures. Therefore, in the specific application, solving the contradiction therebetween will bring a better user experience.

Figure 16:
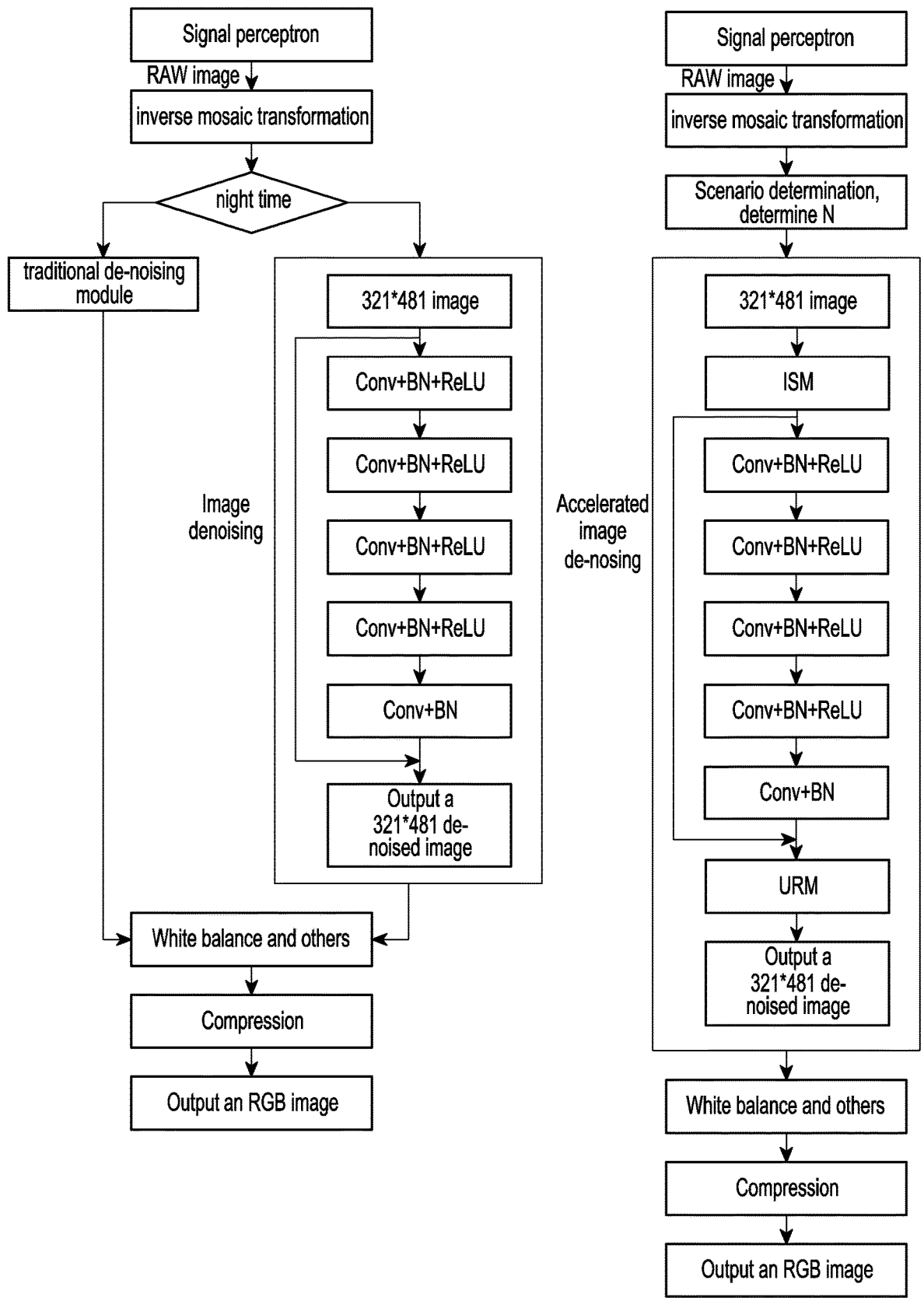
FIG. 16 is a schematic diagram of an application scenario of a specific embodiment 1 of the present disclosure.

For this problem, the taken scenes can be classified and processed separately for different usage scenarios. As shown in FIG. 16, when a RAW image is generated from the perceptron, a simple classification model is used to determine whether the Raw image belongs to a nighttime model scene (low light), and if it does not belong a nighttime scene, the noise is relatively simple and processed by a fast conventional method. Otherwise, the RAW image of the night scene is sent to the deep-learning-based image de-noising module. After the image is de-noised, white balance, color mapping, tone adjustment and other ISP processes are executed. Finally, the output is displayed to the user after compression.

Without loss of generality, in this embodiment, the WIN5-RB model in the image de-noising network is selected in the present disclosure as an example of a convolutional neural network.

The network structure is shown in the left graph of FIG. 16. Its input is a single-channel map of size 481*321 in the grayscale color space, which is followed by five convolution blocks. No down-sampling is performed in these five blocks. A convolution block includes one convolutional layer, one BN (Batch Normalization) layer, and one ReLU (Rectified Linear Unit) activation function layer. The output of the network is a predicted de-noised single channel image.

This scheme is specially designed for nighttime image processing, and it obtains a good image quality at the cost of fast response. To further solve the problem, the image processing method and device described in FIGS. 1 to 15 of the embodiment of the present disclosure can be introduced.

A flowchart of an embodiment of an image processing scheme employing an embodiment of the present disclosure is shown as the right graph of FIG. 16. After the inverse mosaic transformation module, different N values can be selected according to different usage scenarios. For example:

Night scene: N=2
Low light scene: N=3
Daytime scene: N=4
or:
High ISO: N=2
Medium ISO: N=3
Low ISO: N=4

Depending on the super parameter N, different models or the same model can be used. When the same model is selected for different configurations, the number of input channels of the model should be the same as the number of channels in the configuration with a maximum value of N. If the input channel is smaller than the number of channels of the model, the values in the deficient input channels can be set as 0. Without loss of generality, in this specific implementation, a trained model can be configured for each N that is set.

Without loss of generality, in this specific implementation, it is assumed that the user has taken a night scene or it is in a high ISO mode, and N=2 is selected at this time. The input size of the WIN5 RB network is a grayscale image of 481*321. For convenience of calculation, the present disclosure scales the input image from 481*321 to 480*320, and converts it to four small images of 240*160 by the interlaced space module (in this embodiment the interlaced space module can be implemented in hardware, and the speed would be faster). These small images are sequentially superimposed into four channels and sent to the first layer of the WIN5-RB network. As the input resolution is reduced, the amount of calculation of subsequent layers becomes smaller. The last layer of the original WIN5-RB network output is a 481*321 de-noised image. According to the method of the present disclosure, it is modified into four output channels of 240*160 and then passes through a stitch-based up resolution module (in this embodiment, the up resolution module can be implemented in hardware, and the speed is faster) to restore to an image of 480*320, and finally is enlarged to 481*321 by interpolation. In this embodiment, the up resolution module may adopt a reverse manner of the interlacing conversion method, i.e., a stitching conversion. In this embodiment, for the additional convolution kernel added by the interlaced space module and the up resolution module, the initial weight is set to 0 (other initialization strategies may also be adopted), and the remaining weights are initialized to the corresponding weights of the original network. Finally, it performs the process of retraining. In this embodiment, the expansion coefficients of all the feature maps are set as the formula: $\lambda_i=1$, that is, the number of channels of feature maps is kept unchanged.

In other embodiments, a usage scenario of a high definition television display will be described in conjunction with a ULED display.

Video projection has many important applications. For example, a video needs to be projected to a Samsung HDTV, a shopping mall advertising screen, an irregular shape LED advertising screen, a projector, a mobile phone of various resolutions. When the traditional player software plays a video on TVs or mobile phones, the short-edge alignment is often used to maintain the scale of the video content. If the resolution is insufficient, the scale of the video frame is amplified by some interpolation algorithms. However, some applications require a full-screen projection of the played video signal, such as digital video images, ULED projection with various shapes and resolutions, etc., and when the resolution is insufficient, it is necessary to generate a super resolution image for the video frame.

Take video signals from HDTVs with different resolutions as an example. Classic HDTV resolution specifications include: 2K (1920*1080), 4K (3840*2160) and 8K (7680*4320). Without loss of generality, this specific implementation projects a video of 4K to a screen of 8K. Resolution alignment can be done using algorithms such as bilinear interpolation, or a traditional machine learning method based on data driven. This processing can be achieved by a convolutional neural network. The convolutional neural network processes each frame of the video frame by frame. For example, the network consists of three convolution blocks, each of which contains a convolutional layer and an activation function layer, and the resolutions of the first two convolution blocks are consistent with the resolution of the input video, and the third convolution block doubles the resolution to 8K by deconvolution.

This convolutional neural network has a problem: because several convolution blocks in the network maintain resolution without down-sampling, and the resolution of each feature map is as high as 3840*2160, it is difficult for the computing resources configured by the HDTV to meet the needs of real-time computing.

To at least partially address this problem, the convolutional neural network can be improved using the image processing schemes described in FIGS. 1-11 of the embodiments of the present disclosure. To this end, embodiments of the present disclosure provide methods and devices for at least partially addressing the above problems.

Figure 17:
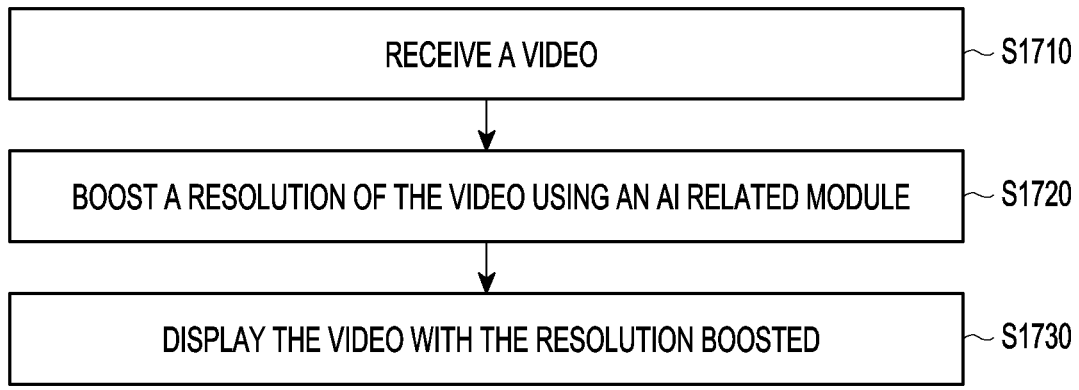
FIG. 17 illustrates a schematic flow chart of an image processing method according to an embodiment of the present disclosure.

FIG. 17 shows a schematic flow chart of an image processing method according to an embodiment of the present disclosure. As shown in FIG. 17, the method includes:

step S1710 of receiving a video;
step S1720 of enlarging the resolution of the video using an AI (Artificial Intelligence) related module; and
step S1730 of displaying the video with the resolution enlarged.

In some embodiments, enlarging a resolution of the video using an AI related module includes: using an AI chip to enlarge the resolution of the video according to the image processing method shown in FIG. 1.

The AI related module may be an AI chip, or any hardware and/or software implementation that can implement AI functionality.

In some embodiments, enlarging a resolution of the video using an AI related module includes: converting a frame in the video to a plurality of target input images using hardware, and processing the plurality of target input images using the AI related module to enlarge the resolution of an output image.

Figure 18:
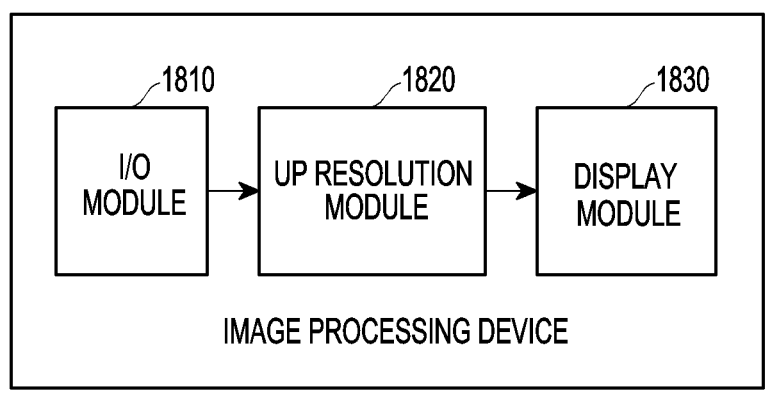
FIG. 18 illustrates a schematic block diagram of an image processing device according to an embodiment of the present disclosure.

FIG. 18 shows a schematic block diagram of an image processing device corresponding to the image processing method shown in FIG. 17 according to an embodiment of the present disclosure. As shown in FIG. 18, the image processing device includes:

an I/O module 1810 for receiving a video;

an up resolution module 1820 configured to enlarge the resolution of the video using an AI (Artificial Intelligence) related module; and a display module 1830 configured to display the video with the resolution enlarged.

In some embodiments, the up resolution module 1820 is configured for: using an AI chip to improve the resolution of the video according to the image processing method of FIG. 17.

The AI related module may be an AI chip, or any hardware and/or software implementation that can implement AI functionality.

In some embodiments, the up resolution module 1820 is configured for: converting a frame in the video to a plurality of target input images using hardware, and processing the plurality of target input images using the AI related module to improve the resolution of an output image.

Figure 19:
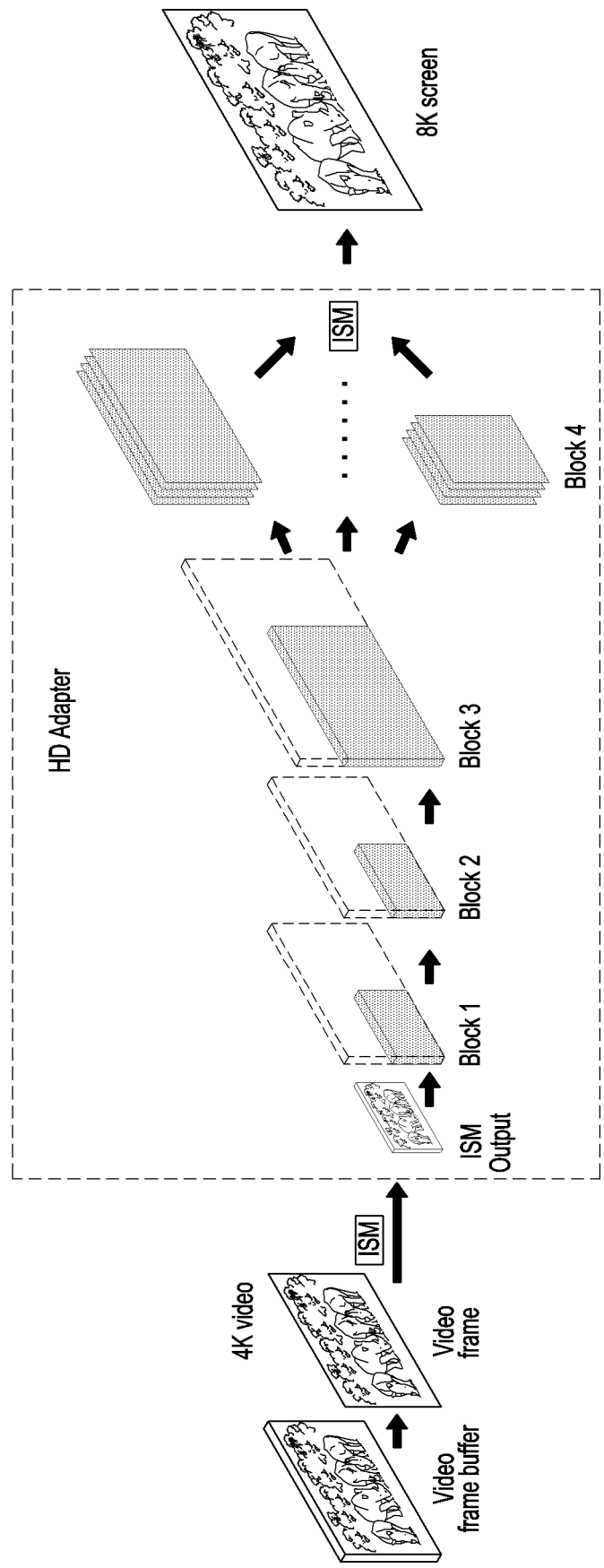
FIG. 19 is a schematic diagram of an application scenario of a specific embodiment 2 of the present disclosure.

The improved network structure is shown in FIG. 19. The ISM (interlaced space module) and the URM (up resolution module) have been added. Assuming that the down resolution parameter of the interlacing space is N=2, the calculation amount of the three convolution blocks are reduced to ¼ of the original, calculation amount, and the subsequent convolution block 4 is the single-channel output of the original convolutional neural network, which is extended to 4 channels. These four channels are combined into a single-channel output via a stitch-based URM module, which is finally presented on the display.

Figure 20:
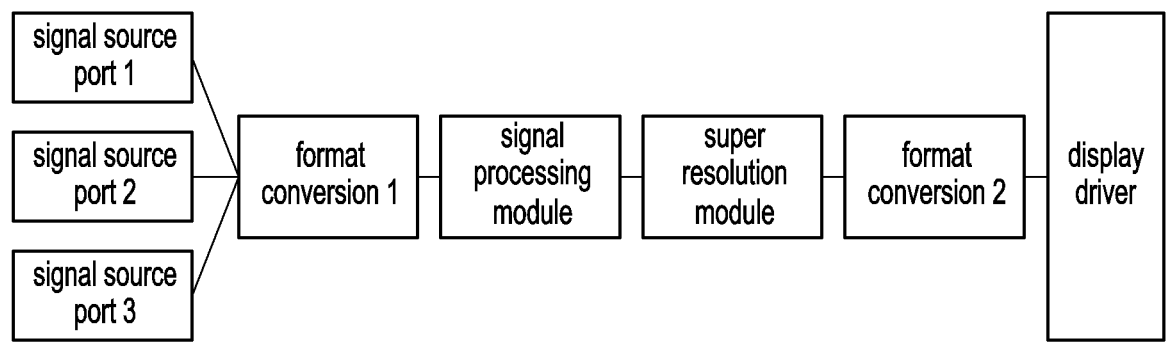
FIG. 20 is a hardware architecture diagram of a specific embodiment 2 of the present disclosure.

In a specific implementation, the related algorithm is used in an HDTV, and an example of a general hardware structure of an HDTV can be seen in FIG. 20. As shown in FIG. 20, the structure may include the following modules: a plurality of signal source ports, such as a Digital Visual Interface (DVI) port, a High Definition Multimedia Interface (HDMI) port, and a television. Tuner (TV-turner) port, etc., a format conversion module 1, a signal processing module, a super resolution module, a format conversion module 2 and the last display driver module. The format conversion module converts the data signals of different sources into a Quad Full High Definition (QFHD) format or other related formats, and then passes them to subsequent modules. The signal processing module performs signal processing operations related to the display screen, such as: TV backlight area adjustment (Local dimming) and the like. The super resolution module improves the image resolution of the frame, so that the output signal is an 8K signal, which is converted by the format conversion module 2 to a signal format that satisfies the requirement of the subsequent display driver module. In this embodiment, the modules are internally connected by electrical connection, and the format conversion module 2 and the display driver module are connected by a cable. It should be noted that the TV may not include the format conversion module 1 and the format conversion module 2. At this time, the signal received by the signal source port is inputted into the signal processing module, and the super resolution module outputs the signal to the display driver module for displaying. In addition, the positions of the signal processing module and the super resolution module can also be exchanged, that is, it firstly enlarge the resolution of the signal and then processes the signal.

Figure 21:
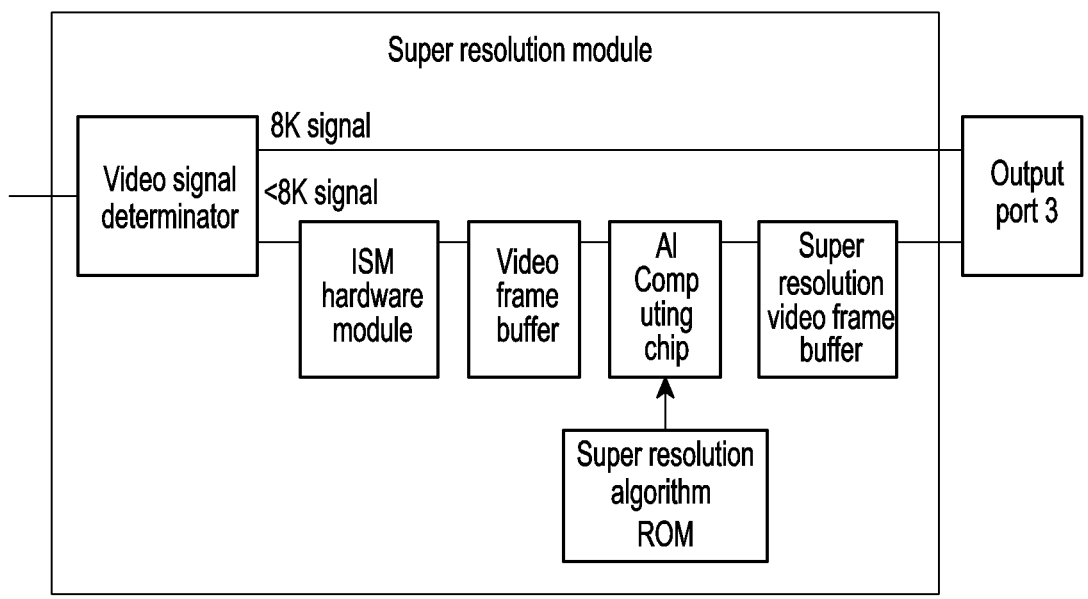
FIG. 21 is a hardware structural diagram of a super resolution module in a hardware architecture of a specific embodiment 2 of the present disclosure.

The function of step S1720 and the up resolution module 1820 can be implemented in the super resolution module shown in FIG. 21. FIG. 21 illustrates a specific example of the hardware implementation of the super resolution module. The module includes an AI computing chip and a super resolution algorithm Read Only Memory (ROM). Among them, the AI computing chip should be selected with appropriate power consumption, for example, a DSP chip or an AI specific Neural Processing Unit (NPU) chip. The super resolution algorithm ROM can be a stand-alone ROM or in an AI computing chip. The super resolution algorithm ROM stores an algorithm that implements the image processing method according to the above-described embodiments of the present disclosure. After the algorithm is read into the AI computing chip, the signal can be subjected to a super resolution processing.

The super resolution module may further include a video signal determiner, and the video signal determiner determines whether the signal is an 8K signal. If the signal is already an 8K signal, the super resolution task would not be performed, and the signal is directly output. If the resolution of the signal is lower than 8K, it would be necessary to execute the super resolution task, and then send the signal to the AI computing chip.

The super resolution module may further include an ISM hardware module, which implements the function of the ISM module in the present disclosure by hardware, decomposes a large input image into several sub-images, and sends the sub-images to the AI computing chip. Specifically, after receiving the signal, the ISM module calculates and stores the corresponding data into the AI computing chip according to the index calculation method introduced by the ISM module in the present disclosure.

The super resolution module may further include a video frame buffer for buffering the sub-images got from the decomposition in the ISM hardware module, and the sub-images are stored by the corresponding address of the video frame buffer. After reading the algorithm, the AI computing chip performs super resolution processing on the images in the corresponding address of the video frame buffer.

The super resolution module may further include a video frame buffer for buffering the 8K signals obtained by the AI calculating chip and sending them to the display module.

With the technical solutions shown in FIG. 17 to FIG. 21, the present disclosure makes it possible to implement super-resolution high-definition display of an existing video by using a deep convolutional neural network, which greatly alleviates the demand for computing resources.

Convolutional neural networks have two effects: the resolution propagation effect and the feature map number effect. A convolutional neural network (CNN) is different from the fully connected neural network. In the same channel, the convolution kernel shares parameters, while the convolution kernel computes a fixed size of the original image, so the resolution of the feature map output from the convolutional layer is proportional to the size of the feature map input to this layer. Similarly, the resolution of the feature map output from the pooling layer, activation function layer, de-convolution layer, etc. is also proportional to the resolution of the input feature map. If a convolutional neural network, especially a full convolutional neural network, changes the resolution of a certain convolution block, the resolutions of all subsequent convolution blocks would be affected in proportion, and the amount of calculation of the convolution block is also proportional to the resolution. The present disclosure refers to this effect as a resolution propagation effect. Its propagation direction is along the direction of distribution of the convolution blocks. The number of feature maps of a certain convolution block can only affect the calculation amount of the current block and the next one convolution block. The present disclosure refers to the later effect as a feature map number effect. The acceleration of the calculation of the convolutional neural network of the present disclosure is based on these two effects.

The technical solution of the embodiments of the present disclosure utilizes the effects to accelerate the calculation. Specifically, a large-resolution input image or feature map can be converted into a plurality of small-resolution target input images or feature maps by the mapping of the interlacing method in the interlaced space. In the interlaced space, the input information maintains the integrity of the input information while the resolution is reduced. Using the mapping of the interlacing method, a large resolution input channel is converted to multiple small resolution input channels, and these small resolution channels can also be restored to the original large resolution channel, thus maintaining the information integrity. It reduces the overall network resolution. An up resolution module is introduced at the end or in the middle of the network to maintain the resolution of the output of the original network.

In addition, the image processing device and method of the present disclosure can trade off the acceleration effect according to different precision requirements of tasks by controlling a part of the small resolution channels to be sent to the network.

The image processing device and method of the present disclosure are different from the existing methods of only reducing the size of the model, and can reduce a large amount of online running memory and memory requirements. On the one hand, the requirement of the amount about memory usage of the computing task on devices can be reduced, and on the other hand, the memory resource requirements of the computing task on the cloud can also be relieved to ease the memory resource burden. For example, the image processing device and method of the present disclosure utilizes the resolution propagation effect in the convolutional neural network and the characteristic of information maintain of the interlaced space to achieve a speed improvement of about N^2 times for the target convolutional neural network, and save a lot of data memory. In particular, the present disclosure proposes a possible acceleration scheme for complex pixel-level tasks.

On the other hand, training and testing of many tasks, for example, image segmentation tasks, are limited by the CPU and GPU memory resources. The input of the model has a fixed and limited image resolution, e.g., 320*320, and a large image shall be scaled or sliced before being sent to the neural network. The image processing device and method of the present disclosure can realistically process large images.

Moreover, the present disclosure does not conflict with existing classical methods and can be used together with existing classical methods.

Heretofore, the embodiments of the present disclosure have been described in detail in conjunction with the accompanying drawings. Based on the above description, those skilled in the art should have a clear understanding of the image processing device and method of the present disclosure.

It should be noted that the implementations that are not shown or described in the drawings or the description are all known to those skilled in the art and are not described in detail. In addition, the above definitions of the various elements and methods are not limited to the specific structures, shapes or manners mentioned in the embodiments, and those skilled in the art can simply modify or replace them.

Of course, the method of the present disclosure also includes other steps according to actual demands, and since they are not related to the innovation of the present disclosure, they are not described here.

The details, the technical solutions, and the beneficial effects of the present disclosure are described in detail in the embodiment of the present disclosure. It is to be understood that the above description is only the embodiment of the present disclosure, and is not intended to limit the disclosure. Any modifications, equivalent substitutions, improvements, etc., made within the spirit and principles of the present disclosure are intended to be included within the scope of the present disclosure.

The invention claimed is:

1. An image processing method comprises:
obtaining an input image;
converting the input image or a feature map of the input image into a plurality of target input images or target feature maps, wherein a resolution of each of the target input images or the target feature maps is smaller than a resolution of the feature map of the input image or the input image, and pixels at the same position in each of the target input images or the target feature maps are of a neighborhood relationship with the input image or the feature map of the input image;
processing at least a part of the plurality of target input images or target feature maps by one or more convolution blocks in a convolutional neural network; and
increasing a resolution of a feature map output from the one or more convolution blocks in the convolutional neural network,
wherein processing the at least the part of the plurality of target input images or target feature maps by the one or more convolution blocks in the convolutional neural network comprises convoluting the at least the part of the plurality of target input images or target feature maps according to information differences of the plurality of target input images or the target feature mas.

2. The image processing method according to claim 1, wherein the feature map of the input image is obtained by processing the input image by the one or more convolution blocks in the convolutional neural network.

3. The image processing method according to claim 1, wherein increasing a resolution of a feature map output from the one or more convolution blocks in the convolutional neural network comprises:
increasing the resolution of the feature map output from any one or more convolution blocks in the convolutional neural network to a resolution that is obtained by only processing the input image in the convolutional neural network.

4. The image processing method according to claim 1, wherein converting the input image or a feature map of the input image into a plurality of target input images or target feature maps comprises:

determining a down resolution ratio N between the resolution of the target input image or the target feature map and the resolution of the feature map of the input image or the input image;

determining a number F*F of the target input images or the target feature maps according to the down resolution ratio N, wherein $$F=U(N)$$

U(·) is a ceiling function; and converting the input image or the feature map of the input image into a number F*F of the target input images or the target feature maps.

5. The image processing method according to claim 4, wherein converting the input image or the feature map of the input image into a number F*F of the target input images or the target feature maps comprises:

performing down-sampling on the input image or the feature map of the input image by a step size N to obtain a number F*F of the target input images or the target feature maps, wherein the sampling formula is:

$$O_{i,j}(x,y)=I(xN+i,yN+j)$$

wherein I and O represent the feature map of the input image or the input image and the target input image or the target feature map, respectively, and i and j are indexes established for the plurality of converted target input images or target feature maps, and i ∈ [0,F), j ∈ [0,F), x and y are abscissa and ordinate of a pixel in a corresponding target input image or target feature map, respectively, and x∈[0,W'), y∈[0,H'), W'=L(W/N), H'=L(H/N), xN+i and yN+j are index values of a pixel in the input image or the feature map of the input image, U(·) represents a ceiling function, L(·) represents a floor function, and W and H represent the width and height of the feature map of the input image or the input image, respectively, W' and H' represent the width and height of the target input image or the target feature map, respectively.

6. The image processing method according to claim 1, wherein processing the at least the part of the plurality of target input images or target feature maps by the one or more convolution blocks in the convolutional neural network further comprises one of:

convoluting a part of the plurality of target input images or target feature maps by each convolution block; and convoluting a part of the plurality of target input images or target feature maps by each weighted con n block.

7. The image processing method according to claim 6, wherein convoluting a part of the plurality of target input images or target feature maps by each convolution block comprises:

convoluting a part of the plurality of target input images or target feature maps by each convolution block, wherein the target input images or the target feature maps of the part have a specific step interval therebetween, or convoluting a part of the plurality of target input images or target feature maps by each convolution block, wherein a correlation between the target input images or the target feature maps of the part processed by one convolution block is higher than a threshold, or the target input images or the target feature maps of the part processed by one convolution block are multiple preset target input images or target feature maps having a correlation.

8. The image processing method according to claim 7, wherein convoluting a part of the plurality of target input images or target feature maps by each convolution block, wherein the target input images or the target feature maps of the part have a specific step interval therebetween, comprises:

dividing the target input images or the target feature maps into R groups of target input images or target feature maps, wherein R is an integer, the target input images or the target feature maps in each group have a step interval R therebetween, and wherein the R groups of target input images or target feature maps do not overlap;

convoluting each group of target input images or target feature maps to obtain a corresponding output feature map, wherein a first target input image or a first target feature map of the t-th group of target input images or target feature maps is the t-th target input image or target feature map, where t∈[0,R−1]; and wherein the i-th target input image or the i-th target feature map of the t-th group of target input images or target feature maps is the (i*R+t)th target input image or the (i*R−t)th target feature map in all target input images or target feature maps, wherein i is a non-negative integer.

9. The image processing method according to claim 6, wherein convoluting at least part of the plurality of target input images or target feature maps by each weighted convolution block comprises:

convoluting the target input images or target feature maps by each convolution block according to the following formula:

$$S_i = \sum_{p=0}^{P} w_{i,p} Conv_{i,p}(M_p)$$

wherein $S_i$ represents the i-th output feature map, $Conv_{i,p}(M_p)$ represents the convolution operation on the p-th target input image or target feature map MP by the i-th convolution kernel, $w_{i,p}$ represents a weight for the i-th convolution kernel corresponding to the p-th target input image or target feature map, and P represents the total number of the target input images or target feature maps.

10. The image processing method according to claim 1, wherein convoluting the at least the part of the plurality of target input images or target feature maps according to the information differences of the plurality of target input images or the target feature maps comprises:

computing the information differences of the plurality of target input images or target feature maps according to the following formula:

$$OS_p=M_p-M_b$$

wherein $M_p$ represents the p-th target input image or target feature map, $M_b$ represents a mapped reference target input image or target feature map, and $OS_p$ is offset information of the p-th target input image or target feature map, the reference target input image or target feature map being the converted first target input image or target feature map.

11. An image processing device comprising:
a transceiver configured to obtain an input image;
at least one processor configured to:
convert the input image or a feature map of the input image into a plurality of target input images or target feature maps, wherein a resolution of each of the target input images or the target feature maps is smaller than a resolution of the feature map of the input image or the input image, and pixels at the same position in each of the target input images or the target feature maps are of a neighborhood relationship in the input image or the feature map of the input image;

process at least Apart of the plurality of target input images or target feature maps by one or more convolution blocks in a convolutional neural network; and increase a resolution of a feature map output from the one or more convolution blocks in the convolutional neural network, wherein to process the at least the part of the plurality of target input images or target feature maps by the one or more convolution blocks in the convolutional neural network, the at least one processor is further configured to convolute the at least the part of the plurality of target input images or target feature maps according to information differences of the plurality of target input images or the target feature maps.

12. The image processing device according to claim 11, wherein the feature map of the input image is obtained by processing the input image by the one or more convolution blocks in the convolutional neural network.

13. The image processing device according to claim 11, wherein the at least one processor is configured to increase the resolution of the feature map output from any one or more convolution blocks in the convolutional neural network to a resolution that is obtained by only processing the input image in the convolutional neural network.

14. The image processing device according to claim 11, wherein to convert the input image or a feature map of the input image into a plurality of target input images or target feature maps, the at least one processor is configured to:

determine a down resolution ratio N between the resolution of the target input image or the target feature map and the resolution of the feature map of the input image or the input image;

determine a number F*F of the target input images or the target feature maps according to the down resolution ratio N, wherein $F=U(N)$ $U(\cdot)$ is a ceiling function; and convert the input image or the feature map of the input image into a number F*F of the target input images or the target feature maps.

15. The image processing device according to claim 14, wherein to converting the input image or the feature map of the input image into a number F*F of the target input images or the target feature maps, the at least one processor is configured to:

perform down-sampling on the input image or the feature map of the input image by a step size N to obtain a number F*F of the target input images or the target feature maps, wherein the sampling formula is:

$O_{i,j}(=x,y)=I(xN+i,yN+j)$ wherein I and O represent the feature map of the input image or the input image and the target input image or the target feature map, respectively, and i and j are indexes established for the plurality of converted target input images or target feature maps, and i∈[0,F), j∈[0, F), x and y are abscissa and ordinate of a pixel in a corresponding target input image or target feature map, respectively, and x∈[0,W'), y∈[0,H'), W'=L(W/N), H'=L(H/N), xN+i and yN+j are index values of a pixel in the input image or the feature map of the input image, $U(\cdot)$ represents a ceiling function, $L(\cdot)$ represents a floor function, and W and H represent the width and height of the feature map of the input image or the input image, respectively, W' and H' represent the width and height of the target input image or the target feature map, respectively.

16. The image processing device according to claim 11, wherein to process the at least the part of the plurality of target input images or target feature maps by the one or more convolution blocks in the convolutional neural network, the at least one processor is further configured to perform one of:

convoluting a part of the plurality of target input images or target feature maps by each convolution block; and convoluting a part of the plurality of target input images or target feature maps by each weighted convolution block.

17. The image processing device according to claim 16, wherein convoluting a part of the plurality of target input images or target feature maps by each convolution block comprises:

convoluting a part of the plurality of target input images or target feature maps by each convolution block, wherein the target input images or the target feature maps of the part have a specific step interval therebetween, or convoluting a part of the plurality of target input images or target feature maps by each convolution block, wherein a correlation between the target input images or the target feature maps of the part processed by one convolution block is higher than a threshold, or the target input images or the target feature maps of the part processed by one convolution block are multiple preset target input images or target feature maps having a correlation.

18. The image processing device according to claim 17, wherein convoluting a part of the plurality of target input images or target feature maps by each convolution block, wherein the target input images or the target feature maps of the part have a specific step interval therebetween, comprises:

dividing the target input images or the target feature maps into R groups of target input images or target feature maps, wherein R is an integer, the target input images or the target feature maps in each group have a step interval R therebetween, and wherein the R groups of target input images or target feature maps do not overlap;

convoluting each group of target input images or target feature maps to obtain a corresponding output feature map, wherein a first target input image or a first target feature map of the t-th group of target input images or target feature maps is the t-th target input image or target feature map, where t∈[0,R−1]; and wherein the i-th target input image or the i-th target feature map of the t-th group of target input images or target feature maps is the (i*R+t)th target input image or the (i*R−t)th target feature map in all target input images or target feature maps, wherein i is a non-negative integer.

19. The image processing device according to claim 16, wherein
   convoluting at least part of the plurality of target input images or target feature maps by each weighted convolution block comprises:
   convoluting the target input images or target feature maps by each convolution block according to the following formula:

$$S_i = \sum_{p=0}^{P} w_{i,p} Conv_{i,p}(M_p)$$

wherein $S_i$ represents the i-th output feature map, $Conv_{i,p}(M_p)$ represents the convolution operation on the p-th target input image or target feature map MP by the i-th convolution kernel, $w_{i,p}$ represents a weight for the i-th convolution kernel corresponding to the p-th target input image or target feature map, and P represents the total number of the target input images or target feature maps.

20. The image processing device according to claim 11, wherein to convolute the at least the part of the plurality of target input images or target feature maps according to information differences of the plurality of target input images or the target feature maps the at least one processor is further configured to:
compute the information differences of the plurality of target input images or target feature maps according to the following formula:

$$OS_p = M_p - M_b$$

wherein $M_p$ represents the p-th target input image or target feature map, $M_b$ represents a mapped reference target input image or target feature map, and $OS_p$ is offset information of the p-th target input image or target feature map, the reference target input image or target feature map being the converted first target input image or target feature map.

* * * * *

UNITED STATES PATENT AND TRADEMARK OFFICE
CERTIFICATE OF CORRECTION

| | |
|---|---|
| PATENT NO. | : 11,967,045 B2 |
| APPLICATION NO. | : 17/272866 |
| DATED | : April 23, 2024 |
| INVENTOR(S) | : Zikun Liu et al. |

It is certified that error appears in the above-identified patent and that said Letters Patent is hereby corrected as shown below:

In the Claims

In Column 32, Line 50, in Claim 1:
"rality of target input images or the target feature mas."
Should be:
-- rality of target input images or the target feature maps. --

In Column 33, Line 46, in Claim 6:
"or target feature maps by each weighted con n block."
Should be:
-- or target feature maps by each weighted convolution block. --

Signed and Sealed this
Eighteenth Day of March, 2025

Coke Morgan Stewart
*Acting Director of the United States Patent and Trademark Office*